(12) United States Patent
Kawamoto et al.

(10) Patent No.: US 7,468,777 B2
(45) Date of Patent: Dec. 23, 2008

(54) METHOD OF PRODUCING ELLIPTICALLY POLARIZING PLATE AND IMAGE DISPLAY USING THE ELLIPTICALLY POLARIZING PLATE

(75) Inventors: Ikuo Kawamoto, Ibaraki (JP); Seiji Umemoto, Ibaraki (JP); Takashi Kamijou, Ibaraki (JP); Hideyuki Yonezawa, Ibaraki (JP); Kazuya Hada, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 528 days.

(21) Appl. No.: 11/354,130

(22) Filed: Feb. 15, 2006

(65) Prior Publication Data

US 2006/0203159 A1    Sep. 14, 2006

(30) Foreign Application Priority Data

Feb. 25, 2005  (JP)  .............................. 2005-051348
Oct. 19, 2005  (JP)  .............................. 2005-303840

(51) Int. Cl.
  *G02F 1/13*    (2006.01)
  *G02F 1/1335*  (2006.01)

(52) U.S. Cl. ........................ 349/187; 349/87; 349/96; 349/117; 349/128; 349/129; 349/191

(58) Field of Classification Search ............ 349/87, 349/96, 117, 128, 129, 187, 191; 359/494, 359/497, 499; 438/1.31
See application file for complete search history.

(56) References Cited

U.S. PATENT DOCUMENTS 5,953,083 A *  9/1999  Sharp ......................... 349/18
6,835,796 B2 * 12/2004  Sakamoto et al. ........... 528/125

FOREIGN PATENT DOCUMENTS

JP    3174367      3/2001
JP    2003-195037  7/2003

* cited by examiner

*Primary Examiner*—Brian Healy
*Assistant Examiner*—Michael P Mooney
(74) *Attorney, Agent, or Firm*—Westerman, Hattori, Daniels & Adrian, LLP.

(57) ABSTRACT

The present invention provides a method of producing an elliptically polarizing plate including the steps of: forming a first birefringent layer on a surface of a transparent protective film; laminating a polarizer on a surface of the transparent protective film; forming a second birefringent layer on a surface of the first birefringent layer; and forming a third birefringent layer on a surface of the second birefringent layer. The first birefringent layer is arranged on the opposite side against the polarizer with respect to the transparent protective film. The step of forming the first birefringent layer includes the steps of: applying a liquid crystal material onto a substrate subjected to an alignment treatment; treating the applied liquid crystal material, so as to form the first birefringent layer on the substrate; and transferring the first birefringent layer onto a surface of the transparent protective film.

26 Claims, 9 Drawing Sheets

METHOD OF PRODUCING ELLIPTICALLY POLARIZING PLATE AND IMAGE DISPLAY USING THE ELLIPTICALLY POLARIZING PLATE

This application claims priority under 35 U.S.C. Section 119 to Japanese Patent Application No. 2005-51348 filed on Feb. 25, 2005, which is herein incorporated by reference.

FIELD OF THE INVENTION

The present invention relates to a method of producing an elliptically polarizing plate, and to an image display using the elliptically polarizing plate. The present invention more specifically relates to a method of producing a broadband and wide viewing angle elliptically polarizing plate having excellent optical characteristics in an oblique direction and having excellent adhesiveness between adjacent films (layers) at very high efficiency, to an elliptically polarizing plate obtained through the method, and to an image display using the elliptically polarizing plate.

DESCRIPTION OF THE RELATED ART

Various optical films each having a polarizing film and a retardation plate in combination are generally used for various image displays such as a liquid crystal display and an electroluminescence (EL) display, to thereby obtain optical compensation.

In general, a circularly polarizing plate which is one type of optical films can be produced by combining a polarizing film and a quarter wavelength plate (hereinafter, referred to as a λ/4 plate). However, the λ/4 plate has characteristics providing larger retardation values with shorter wavelengths, so-called "positive wavelength dispersion characteristics", and the λ/4 plate generally has high positive wavelength dispersion characteristics. Thus, the λ/4 plate has a problem in that it cannot exhibit desired optical characteristics (such as functions of the λ/4 plate) over a wide wavelength range. In order to avoid the problem, there has been recently proposed a retardation plate having wavelength dispersion characteristics providing larger retardation values with longer wavelengths, so-called "reverse dispersion characteristics" such as a polynorbornene-based film or a modified polycarbonate-based film. However, such a film has problems in cost.

At present, a λ/4 plate having positive wavelength dispersion characteristics is combined with a retardation plate providing larger retardation values with longer wavelengths or a half wavelength plate (hereinafter, referred to as a λ/2 plate), to thereby correct the wavelength dispersion characteristics of the λ/4 plate (see JP 3174367 B, for example).

In a case where a polarizing film, a λ/4 plate, and a λ/2 plate are combined as described above, angles of respective optical axes, that is, angles between an absorption axis of the polarizing film and slow axes of the respective retardation plates must be adjusted. However, the optical axes of the polarizing film and the retardation plates each formed of a stretched film generally vary depending on stretching directions. The respective films must be cut out in accordance with directions of the respective optical axes and laminated, to thereby laminate the films such that the absorption axis and the slow axes are at desired angles. More specifically, an absorption axis of a polarizing film is generally in parallel with its stretching direction, and a slow axis of a retardation plate is also in parallel with its stretching direction. Thus, for lamination of the polarizing film and the retardation plate at an angle between the absorption axis and the slow axis of 45°, for example, one of the films must be cut out in a direction of 45° with respect to a longitudinal direction (stretching direction) of the film. In the case where a film is cut out and then attached as described above, angles between optical axes may vary with respect to every cut-out film, for example, which may result in problems of variation in quality with respect to every product and production requiring high cost and long time. Further problems include increased waste by cutting out of the films, and difficulties in production of large films.

As a countermeasure to the problems, there is proposed a method of adjusting a stretching direction by stretching a polarizing film or a retardation plate in an oblique direction or the like (see JP 2003-195037 A, for example). However, the method has a problem in that the adjustment involves difficulties.

Further, an circularly polarizing plate including a combination of a polarizing film, a λ/4 plate, and a λ/2 plate has another problem. Specifically, triacetylcellulose (TAC) is usually used as a protective layer for a polarizing film. In many cases, satisfactory circularly polarizing function cannot be obtained in an oblique direction due to thickness direction retardation inherent in the TAC film.

SUMMARY OF THE INVENTION

The present invention has been made in view of solving the conventional problems as described above, and an object of the present invention is therefore to provide: a method of producing a broadband, wide viewing angle elliptically polarizing plate having excellent optical characteristics in an oblique direction and having excellent adhesiveness between adjacent films (layers) at very high efficiency; an elliptically polarizing plate obtained through the method; and an image display using the elliptically polarizing plate.

The inventors of the present invention have conducted intensive studies on properties of the elliptically polarizing plate, and have found that the above-mentioned object may be attained by laminating a birefringent layer having specific optical properties in addition to a λ/4 plate and a λ/2 plate wherein the λ/2 plate has been formed on a substrate by a specific method and then transferred, to thereby complete the present invention.

A method of producing an elliptically polarizing plate according to an embodiment of the present invention includes the steps of: forming a first birefringent layer on a surface of a transparent protective film (T); laminating a polarizer on a surface of the transparent protective film (T); laminating a polymer film on a surface of the first birefringent layer, so as to form a second birefringent layer; and forming a third birefringent layer having a refractive index profile of nz>nx=ny on a surface of the second birefringent layer, wherein the first birefringent layer is arranged on the opposite side against the polarizer with respect to the transparent protective film (T), and wherein the step of forming the first birefringent layer comprises the steps of: applying an application liquid containing a liquid crystal material onto a substrate subjected to an alignment treatment; treating the applied liquid crystal material at a temperature at which the liquid crystal material exhibits a liquid crystal phase, so as to form the first birefringent layer on the substrate; and transferring the first birefringent layer formed on the substrate onto a surface of the transparent protective film (T).

In one embodiment of the present invention, all of the polarizer, the transparent protective film (T), the first birefringent layer formed on the substrate, and the polymer film which forms the second birefringent layer comprise long films; the polarizer, the transparent protective film (T), and the first birefringent layer formed on the substrate are continuously attached together while respective longitudinal directions being arranged in the same direction, so as to form a laminate having the polarizer, the transparent protective film (T), the first birefringent layer, and the substrate in the order; the substrate is peeled off from the laminate; and the laminate from which the substrate is peeled off and the polymer film which forms the second birefringent layer are continuously attached together while respective longitudinal directions being arranged in the same direction.

A method of producing an elliptically polarizing plate according to another embodiment of the present invention includes the steps of: forming a third birefringent layer having a refractive index profile of nz>nx=ny on a surface of a transparent protective film (T); laminating a polarizer on a surface of the transparent protective film (T); forming a first birefringent layer on a surface of the third birefringent layer; and laminating a polymer film on a surface of the first birefringent layer, so as to form a second birefringent layer; and wherein the third birefringent layer is arranged on the opposite side against the polarizer with respect to the transparent protective film (T), and wherein the step of forming the first birefringent layer comprises the steps of: applying an application liquid containing a liquid crystal material onto a substrate subjected to an alignment treatment; treating the applied liquid crystal material at a temperature at which the liquid crystal material exhibits a liquid crystal phase, so as to form the first birefringent layer on the substrate; and transferring the first birefringent layer formed on the substrate onto a surface of the third birefringent layer.

In one embodiment of the present invention, all of the polarizer, the transparent protective film (T), the third birefringent layer, the first birefringent layer formed on the substrate, and the polymer film which forms the second birefringent layer comprise long films; a laminate having the polarizer, the transparent protective film (T), and the third birefringent layer in the order, and the first birefringent layer formed on the substrate are continuously attached together while respective longitudinal directions being arranged in the same direction, so as to form a laminate having the polarizer, the transparent protective film (T), the third birefringent layer, the first birefringent layer, and the substrate in the order; the substrate is peeled off from the laminate; and the laminate from which the substrate is peeled off and the polymer film which forms the second birefringent layer are continuously attached together while respective longitudinal directions being arranged in the same direction.

In another embodiment of the present invention, the liquid crystal material comprises at least one of a liquid crystal monomer and a liquid crystal polymer.

In still another embodiment of the present invention, the first birefringent layer comprises a λ/2 plate.

In still another embodiment of the present invention, the second birefringent layer comprises a λ/4 plate.

In still another embodiment of the present invention, the substrate comprises a polyethylene terephthalate film.

In still another embodiment of the present invention, the polymer film comprises a stretched film.

In still another embodiment of the present invention, an absorption axis of the polarizer and a slow axis of the second birefringent layer are substantially perpendicular to each other.

In still another embodiment of the present invention, a slow axis of the first birefringent layer defines one angle of +8° to +38° and −8° to −38° with respect to an absorption axis of the polarizer.

In still another embodiment of the present invention, the transparent protective film (T) is formed of a film containing triacetylcellulose as a main component.

According to another aspect of the present invention, an elliptically polarizing plate is provided. The elliptically polarizing plate is produced through the above-described production method.

According to still another aspect of the present invention, an image display is provided. The image display includes the above-described elliptically polarizing plate. In one embodiment of the present invention, the elliptically polarizing plate is arranged on a viewer side.

According to the present invention, the slow axis of the first birefringent layer which can function as a λ/2 plate can be set in any desired directions, and thus along polarizing film (polarizer) stretched in a longitudinal direction (that is, a film having an absorption axis in a longitudinal direction) can be used. In other words, a long first birefringent layer formed on a long substrate which has been subjected to the alignment treatment at a predetermined angle with respect to its longitudinal direction, a long transparent protective film and a long polarizing film (polarizer) may be continuously attached together while the respective longitudinal directions being arranged in the same direction (by so-called roll to roll). Alternatively, a long first birefringent layer formed on a long substrate which has been subjected to the alignment treatment at a predetermined angle with respect to its longitudinal direction and a laminate having a long polarizing film (polarizer) and a long transparent protective film may be continuously attached together by roll to roll. Thus, an elliptically polarizing plate can be obtained at very high production efficiency. According to the method of the present invention, the transparent protective film or the polarizer need not be cut out obliquely with respect to its longitudinal direction (stretching direction) for lamination. As a result, angles of optical axes do not vary with respect to every cut-out film, resulting in an elliptically polarizing film without variation in quality with respect to every product. Further, no wastes are produced by cutting of the film, and the elliptically polarizing plate can be obtained at low cost and production of a large polarizing plate is facilitated. Furthermore, according to an embodiment of the present invention, the second birefringent layer is easily formed by laminating the polymer film on a surface of the first birefringent layer. Long sides of the polymer film and the first birefringent layer may be continuously attached together, so as to obtain the second birefringent layer on the first birefringent layer. Thus, an elliptically polarizing plate can be obtained at very high production efficiency. Since the elliptically polarizing plate may be obtained by using so-called roll to roll attachment, adhesiveness between adjacent layers (films) can be very excellent. Furthermore, according to the present invention, the third birefringent layer having a refractive index profile of nz>nx=ny is used in combination with the λ/4 plate and the λ/2 plate. Therefore, a broadband and wide viewing angle elliptically polarizing plate with excellent properties even in an oblique direction, and an image display using the same can be obtained.

DESCRIPTION OF THE PREFERRED EMBODIMENTS

A. Elliptically Polarizing Plate

A-1. Overall Structure of Elliptically Polarizing Plate

Figure 1A:
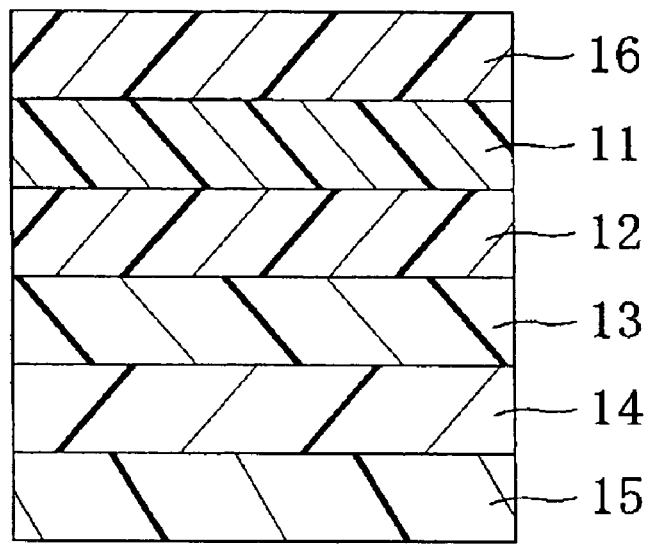
FIG. 1 is a schematic sectional view of an elliptically polarizing plate according to a preferred embodiment of the present invention.
Figure 1B:
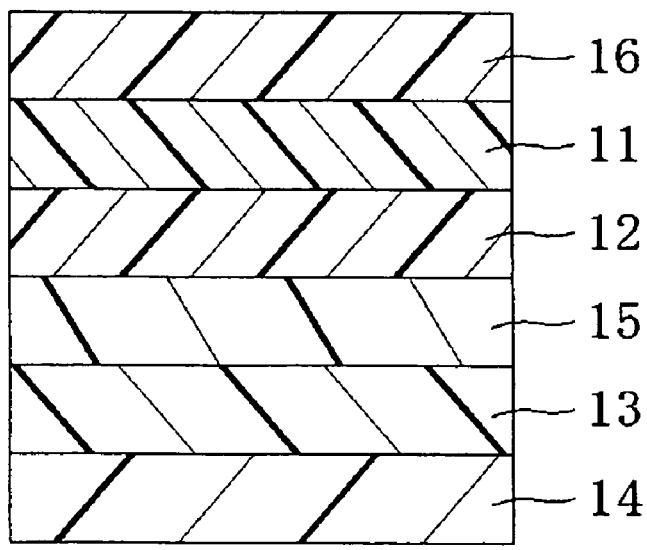

An elliptically polarizing plate according to an embodiment of the present invention includes a polarizer, a protective layer, a first birefringent layer, a second birefringent layer, and a third birefringent layer. Any appropriate order may be employed as an order of laminating the layers as long as effects of the present invention can be provided. For example, as shown in FIG. 1A, an elliptically polarizing plate 10 is provided with a polarizer 11, a protective layer (a transparent protective film) 12, a first birefringent layer 13, a second birefringent layer 14, and a third birefringent layer 15 in the order given. Such a structure allows favorable compensation of different polarization states due to shift in optical axes of the respective layers viewed from an oblique direction or to retardation of the protective layer, to thereby secure functions of the polarizing plate in a wide viewing angle. Alternatively, as shown in FIG. 1B, the third birefringent layer 15 may be arranged between the protective layer 12 and the first birefringent layer 13. In such a structure, the retardation of the protective layer is cancelled out by that of the third birefringent layer, to thereby recover linear polarization properties of light emitted from the polarizing plate and secure functions of the polarizing plate in a wide viewing angle. For practical use, the elliptically polarizing plate according to an embodiment of the present invention may be provided with a second protective layer 16 on a side of the polarizer without the protective layer 12 arranged thereon.

The first birefringent layer 13 may serve as a so-called $\lambda/2$ plate. In the specification of the present invention, the $\lambda/2$ plate refers to a plate having a function of converting linearly polarized light having a specific vibration direction into linearly polarized light having a vibration direction perpendicular thereto, or converting right-handed circularly polarized light into left-handed circularly polarized light (or converting left-handed circularly polarized light into right-handed circularly polarized light).

The second birefringent layer 14 may serve as a so-called $\lambda/4$ plate. In the specification of the present invention, the $\lambda/4$ plate refers to a plate having a function of converting linearly polarized light of a specific wavelength into circularly polarized light (or converting circularly polarized light into linearly polarized light).

The third birefringent layer 15 has a refractive index profile of $nz>nx=ny$. A ratio $Rth_3/Rthp$ of an absolute value of thickness direction retardation of the third birefringent layer 15 $Rth_3$ to an absolute value of thickness direction retardation of the protective layer 12 Rthp is preferably 1.1 to 4.0, and more preferably 1.5 to 3.0. Such a relationship in thickness direction retardation of the protective layer 12 and the third birefringent layer 15 allows favorable compensation of retardation of the protective layer, to thereby provide an elliptically polarizing plate with excellent properties in an oblique direction.

Here, nx represents a refractive index in a direction providing a maximum in-plane refractive index (that is, a slow axis direction), ny represents an in-plane refractive index in a direction perpendicular to the slow axis, and nz represents a thickness direction refractive index. Further, the expression "nx=ny" includes not only a case where nx and ny are exactly equal, but also a case where nx and ny are substantially equal. In the specification of the present invention, the phrase "substantially equal" includes a case where nx and ny differ without providing effects on overall polarization properties of an elliptically polarizing plate in practical use. A thickness direction retardation Rth ($Rth_3$, Rthp, and so on) is determined from an equation $Rth=\{(nx+ny)/2-nz\}\times d$ (where, d (nm) represents a thickness of a film (layer)).

Figure 2:
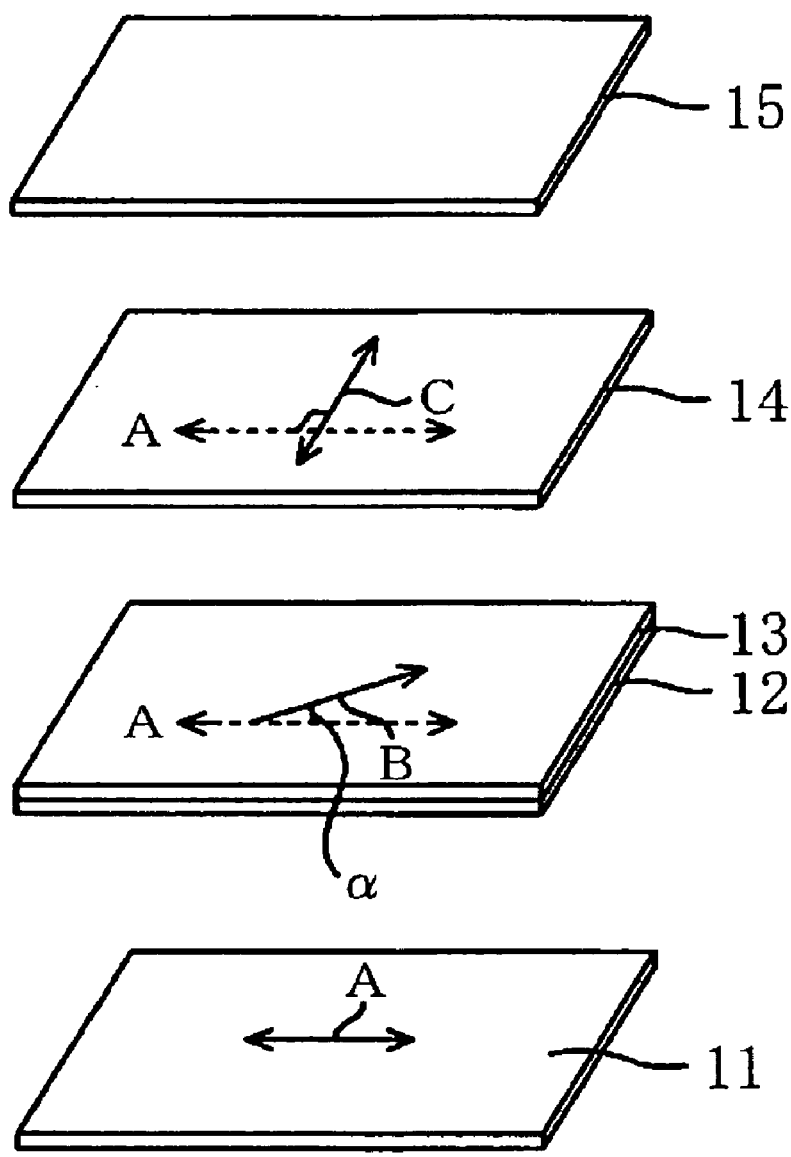
FIG. 2 is an exploded perspective view of an elliptically polarizing plate according to a preferred embodiment of the present invention.

FIG. 2 is an exploded perspective view explaining optical axes of respective layers constituting an elliptically polarizing plate according to a preferred embodiment of the present invention (In FIG. 2, the second protective layer 16 is omitted for clarity). The first birefringent layer 13 is arranged such that its slow axis B is defined at a predetermined angle α with respect to an absorption axis A of the polarizer 11. The angle α is preferably +8° to +38° or −8° to −38°, more preferably +13° to +33° or −13° to −33°, particularly preferably +19° to +29° or −19° to −29°, especially preferably +21° to +27° or −21° to −27°, and most preferably +23° to +24° or −23° to −24°. The first birefringent layer and the polarizer are arranged at such an angle α as described above, to thereby provide a polarizing plate with excellent circularly polarization properties. As shown in FIG. 2, the second birefringent layer 14 is arranged such that its slow axis C is substantially perpendicular to the absorption axis A of the polarizer 11. In the specification of the present invention, the phrase "substantially perpendicular" includes a case at an angle of 90°±2.0°, preferably 90°±1.0°, and more preferably 90°±0.5°.

A total thickness of the elliptically polarizing plate of the present invention is preferably 80 to 250 μm, more preferably 110 to 220 μm, and most preferably 140 to 190 μm. The elliptically polarizing plate of the present invention may greatly contribute to reduction in thickness of an image display apparatus. Hereinafter, each of the layers constituting the elliptically polarizing plate of the present invention will be described more specifically.

A-2. First Birefringent Layer

As described above, the first birefringent layer 13 may serve as a so-called $\lambda/2$ plate. The first birefringent layer serves as a $\lambda/2$ plate, to thereby appropriately adjust retardation of wavelength dispersion characteristics (in particular, a wavelength range at which the retardation departs from $\lambda/4$) of the second birefringent layer serving as a $\lambda/4$ plate. An in-plane retardation (Δnd) of the first birefringent layer at a wavelength of 590 nm is preferably 180 to 300 nm, more preferably 210 to 280 nm, and most preferably 230 to 240 nm.

The in-plane retardation (Δnd) is determined from an equation Δnd=(nx−ny)×d. Here, nx represents a refractive index in a direction of a slow axis, ny represents a refractive index in a direction of a fast axis (direction perpendicular to the slow axis in the same plane), and d represents a thickness of the first birefringent layer. The first birefringent layer 13 preferably has a refractive index profile of nx>ny=nz. nz represents a refractive index in a thickness direction. In the specification of the present invention, the equation "ny=nz" includes not only a case where ny and nz are exactly the same, but also a case where ny and nz are substantially equal.

A thickness of the first birefringent layer is set such that it serves as a λ/2 plate most appropriately. In other words, the thickness thereof is set to provide a desired in-plane retardation. More specifically, the thickness is preferably 0.5 to 5 μm, more preferably 1 to 4 μm, and most preferably 1.5 to 3 μm.

Any suitable materials may be used as a material forming the first birefringent layer as long as the above characteristics are provided. A liquid crystal material is preferred, and a liquid crystal material (nematic liquid crystal) having a nematic phase as a liquid crystal phase is more preferred. Examples of the liquid crystal material include a liquid crystal polymer and a liquid crystal monomer. Liquid crystallinity of the liquid crystal material may develop through a lyotropic mechanism or a thermotropic mechanism. Further, an alignment state of the liquid crystal is preferably homogeneous alignment.

A liquid crystal monomer used as the liquid crystal material is preferably a polymerizable monomer and/or a crosslinkable monomer, for example. As described below, this is because the alignment state of the liquid crystal monomer can be fixed by polymerizing or crosslinking the liquid crystal monomer. The alignment state of the liquid crystal monomer can be fixed by aligning the liquid crystal monomer, and then polymerizing or crosslinking the liquid crystal monomers, for example. A polymer is formed through polymerization, and a three-dimensional network structure is formed through crosslinking. The polymer and the three-dimensional network structure are not liquid-crystalline. Thus, the formed first birefringent layer will not undergo phase transition into a liquid crystal phase, a glass phase, or a crystal phase by change in temperature, which is specific to a liquid crystal compound. As a result, the first birefringent layer is a birefringent layer which has excellent stability and is not affected by change in temperature.

Any suitable liquid crystal monomers may be employed as the liquid crystal monomer. For example, there are used polymerizable mesogenic compounds and the like described in JP 2002-533742 A (WO 00/37585), EP 358208 (U.S. Pat. No. 5,211,877), EP 66137 (U.S. Pat. No. 4,388,453), WO 93/22397, EP 0261712, DE 19504224, DE 4408171, GB 2280445, and the like. Specific examples of the polymerizable mesogenic compounds include: LC242 (trade name) available from BASF Aktiengesellschaft; E7 (trade name) available from Merck & Co., Inc.; and LC-Silicone-CC3767 (trade name) available from Wacker-Chemie GmbH.

For example, a nematic liquid crystal monomer is preferred as the liquid crystal monomer, and a specific example thereof includes a monomer represented by the below-indicated formula (1). The liquid crystal monomer may be used alone or in combination of two or more thereof.

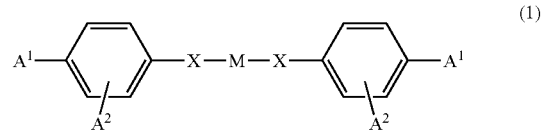

(1)

In the above formula (1), $A^1$ and $A^2$ each represent a polymerizable group, and may be the same or different from each other. One of $A^1$ and $A^2$ may represent hydrogen. Each X independently represents a single bond, —O—, —S—, —C=N—, —O—CO—, —CO—O—, —O—CO—O—, —CO—NR—, —NR—CO—, —NR—, —O—CO—NR—, —NR—CO—O—, —CH$_2$—O—, or —NR—CO—NR—. R represents H or an alkyl group having 1 to 4 carbon atoms. M represents a mesogen group.

In the above formula (1), Xs may be the same or different from each other, but are preferably the same.

Of monomers represented by the above formula (1), each $A^2$ is preferably arranged in an ortho position with respect to $A^1$.

$A^1$ and $A^2$ are preferably each independently represented by the below-indicated formula (2), and $A^1$ and $A^2$ preferably represent the same group.

Z-X-(Sp)$_n$ (2)

In the above formula (2), Z represents a crosslinkable group, and X is the same as that defined in the above formula (1). Sp represents a spacer consisting of a substituted or unsubstituted linear or branched alkyl group having 1 to 30 carbon atoms. n represents 0 or 1. A carbon chain in Sp may be interrupted by oxygen in an ether functional group, sulfur in a thioether functional group, a non-adjacent imino group, an alkylimino group having 1 to 4 carbon atoms, or the like.

In the above formula (2), Z preferably represents any one of functional groups represented by the below-indicated formulae. In the below-indicated formulae, examples of R include a methyl group, an ethyl group, an n-propyl group, an i-propyl group, an n-butyl group, an i-butyl group, and a t-butyl group.

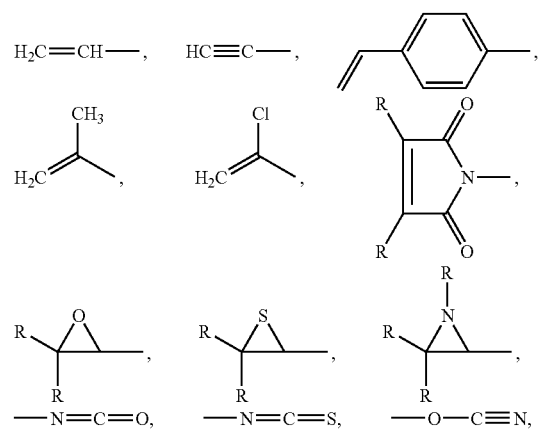

In the above formula (2), Sp preferably represents any one of structural units represented by the below-indicated formulae. In the below-indicated formulae, m preferably represents 1 to 3, and p preferably represents 1 to 12.

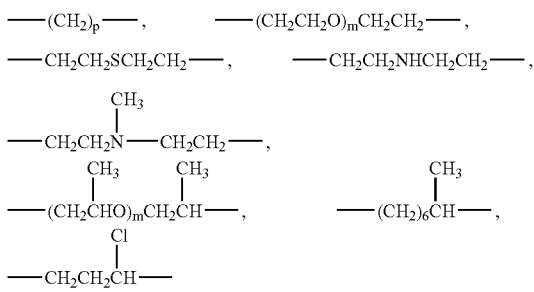

In the above formula (1), M is preferably represented by the below-indicated formula (3). In the below-indicated formula (3), X is the same as that defined in the above formula (1). Q represents a substituted or unsubstituted linear or branched alkylene group, or an aromatic hydrocarbon group, for example. Q may represent a substituted or unsubstituted linear or branched alkylene group having 1 to 12 carbon atoms, for example.

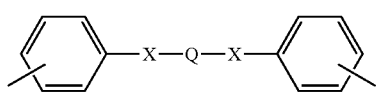
(3)

In the case where Q represents an aromatic hydrocarbon group, Q preferably represents any one of aromatic hydrocarbon groups represented by the below-indicated formulae or substituted analogues thereof.

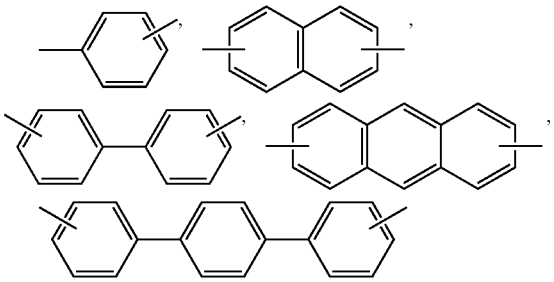

The substituted analogues of the aromatic hydrocarbon groups represented by the above formulae may each have 1 to 4 substituents per aromatic ring, or 1 to 2 substituents per aromatic ring or group. The substituents may be the same or different from each other. Examples of the substituents include: an alkyl group having 1 to 4 carbon atoms; a nitro group; a halogen group such as F, Cl, Br, or I; a phenyl group; and an alkoxy group having 1 to 4 carbon atoms.

Specific examples of the liquid crystal monomer include monomers represented by the following formulae (4) to (19).

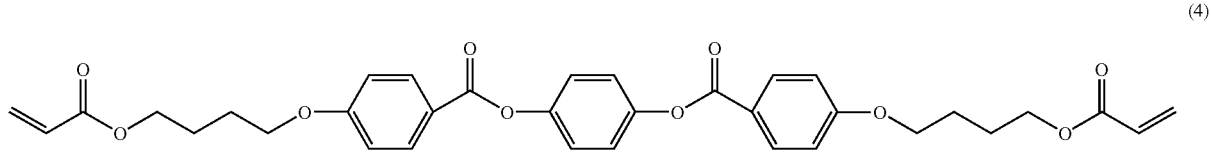
(4)

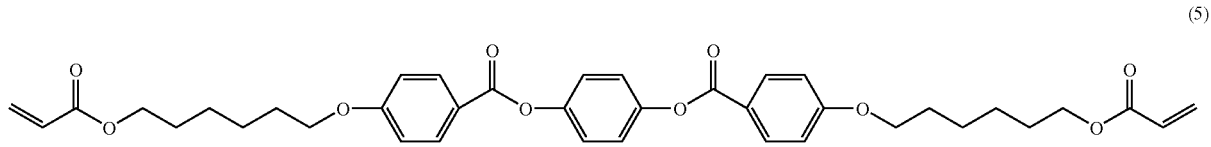
(5)

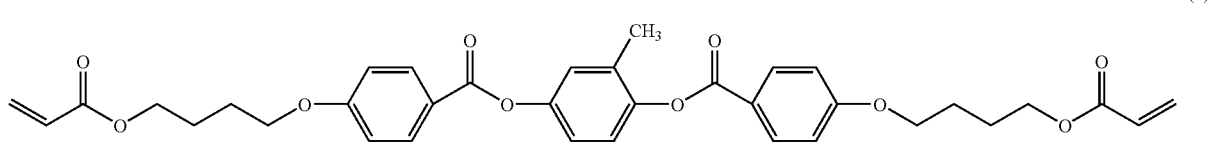
(6)

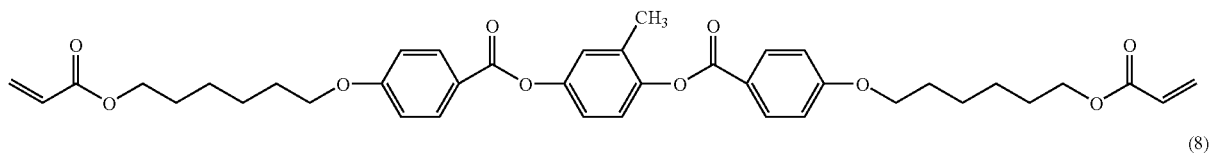
(7)

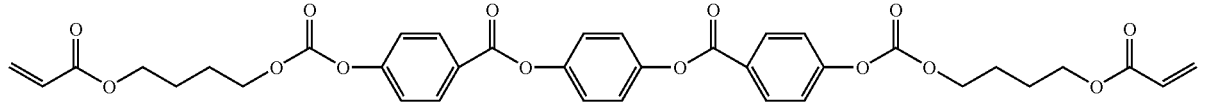
(8)

-continued
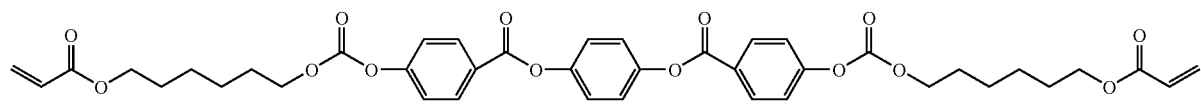
(9)
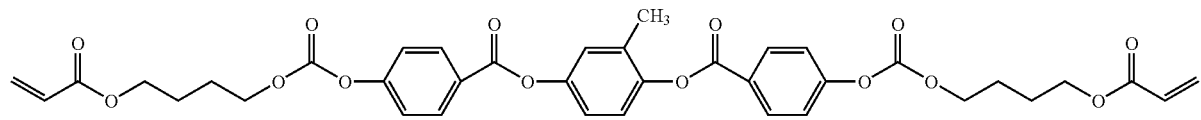
(10)
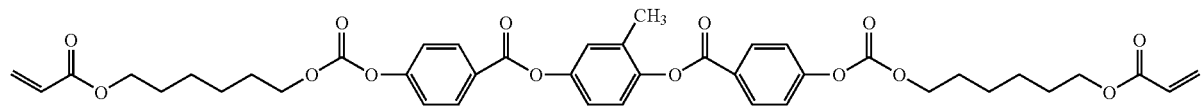
(11)
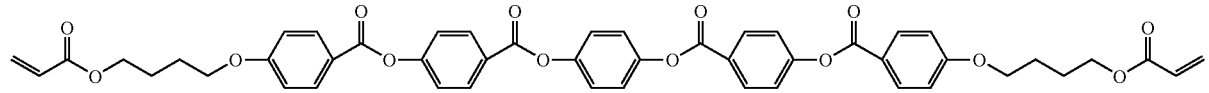
(12)
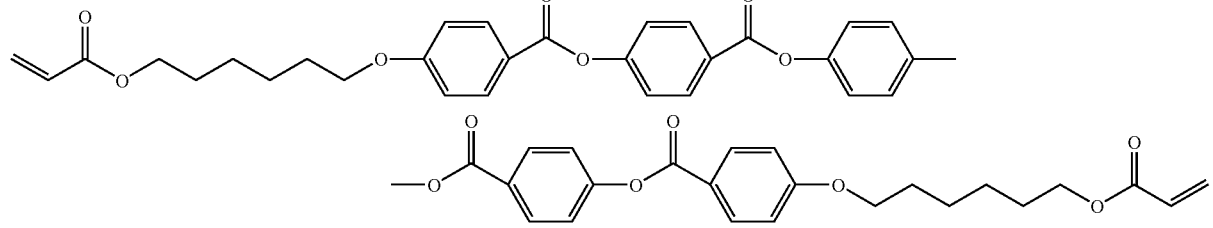
(13)
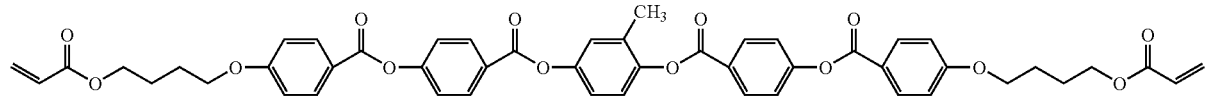
(14)
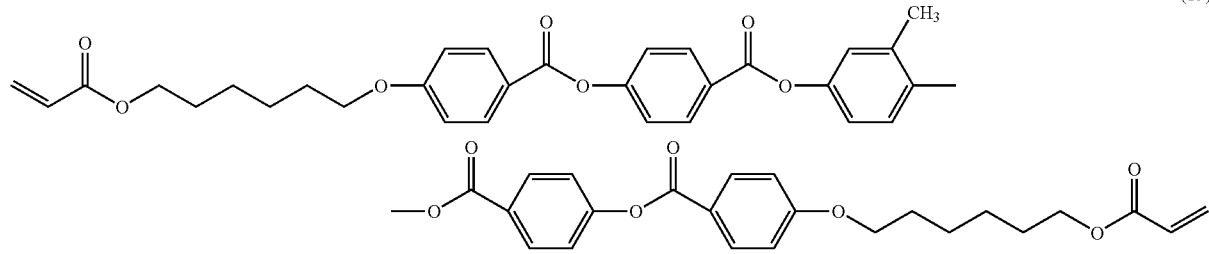
(15)
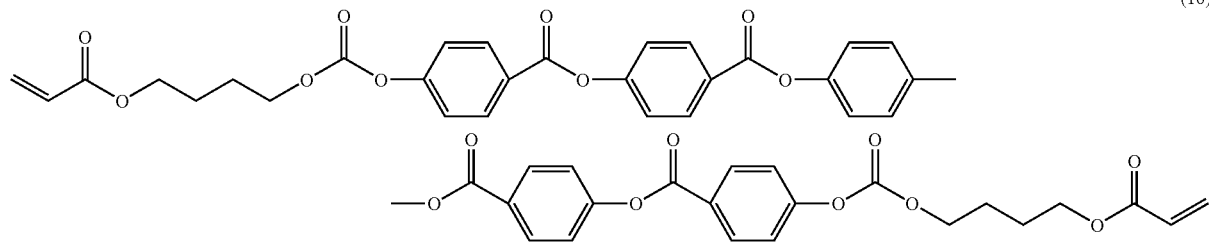
(16)

-continued

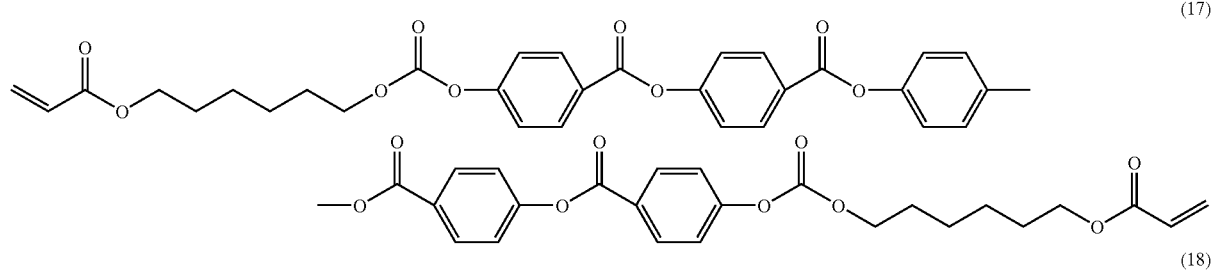

(17)

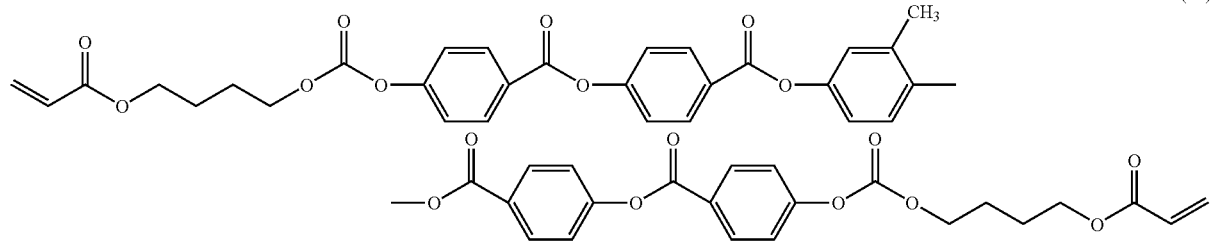

(18)

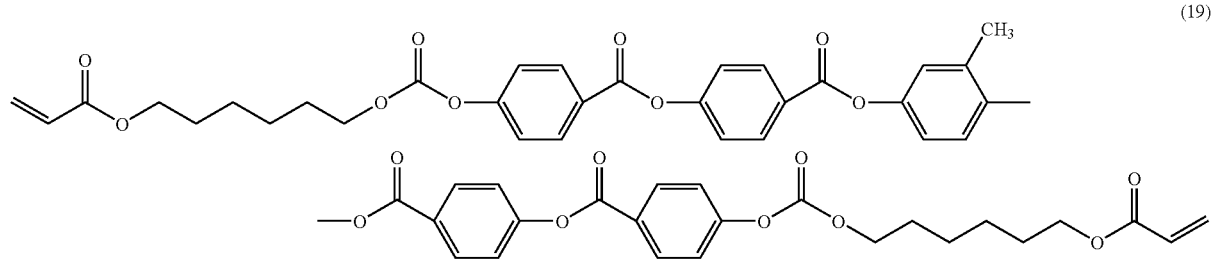

(19)

A temperature range in which the liquid crystal monomer exhibits liquid-crystallinity varies depending on the type of liquid crystal monomer. More specifically, the temperature range is preferably 40 to 120° C., more preferably 50 to 100° C., and most preferably 60 to 90° C.

A-3. Second Birefringent Layer

As described above, the second birefringent layer 14 may serve as a so-called λ/4 plate. According to the present invention, the wavelength dispersion characteristics of the second birefringent layer serving as a λ/4 plate are corrected by optical characteristics of the first birefringent layer serving as a λ/2 plate, to thereby exhibit satisfactory circularly polarizing function over a wide wavelength range. An in-plane retardation (Δnd) of the second birefringent layer at a wavelength of 550 nm is preferably 90 to 180 nm, more preferably 90 to 150 nm, and most preferably 105 to 135 nm. An Nz coefficient (=(nx−nz)/(nx−ny)) of the second birefringent layer is preferably 1.0 to 2.2, more preferably 1.2 to 2.0, and most preferably 1.4 to 1.8. Further, the second birefringent layer 14 preferably has a refractive index profile of nx>ny>nz.

A thickness of the second birefringent layer is set such that it serves as a λ/4 plate most appropriately. In other words, the thickness thereof is set to provide a desired in-plane retardation. More specifically, the thickness is preferably 10 to 100 µm, more preferably 20 to 80 µm, and most preferably 40 to 70 µm.

The second birefringent layer is generally formed by subjecting a polymer film to stretching treatment. A second birefringent layer having the desired optical characteristics (such as refractive index profile, in-plane retardation, thickness direction retardation, and Nz coefficient) may be obtained by appropriately selecting the type of polymer, stretching conditions, a stretching method, and the like.

Any suitable polymers may be employed as a polymer constituting the polymer film. Specific examples of the polymer include polymers such as a polycarbonate-based polymer, a norbornene-based polymer, a cellulose-based polymer, a polyvinyl alcohol-based polymer, and a polysulfone-based polymer.

Alternatively, the second birefringent layer is constituted by a film formed of a resin composition containing polymerizable liquid crystal and a chiral agent. The polymerizable liquid crystal and the chiral agent are described in JP 2003-287623 A, which is incorporated herein by reference. For example, the above-described resin composition is applied onto any suitable substrate, and the whole is heated to a temperature at which the polymerizable liquid crystal exhibits a liquid crystal state. Thus, the polymerizable liquid crystal is aligned in a twisted state (more specifically, by forming a cholesteric structure) by the chiral agent. The polymerizable liquid crystal is polymerized in this state, to thereby provide a film having the fixed cholesteric structure. A content of the chiral agent in the composition is adjusted, to allow change in degree of twist of the cholesteric structure. As a result, a direction of the slow axis of the resultant second birefringent layer may be controlled. Such a film is very preferred because the direction of the slow axis can be set at an angle other than 0° (parallel) or 90° (perpendicular) with respect to the absorption axis of the polarizer.

A-4. Third Birefringent Layer

As described above, the third birefringent layer 15 has a refractive index profile of nz>nx=ny and may serve as a so-called positive C plate. Preferably, an absolute value of thickness direction retardation of the third birefringent layer Rth₃ is at a specific ratio with respect to an absolute value of thickness direction retardation of the protective layer Rthp.

The third birefringent layer having such optical properties is provided, to thereby allow favorable compensation of the thickness direction retardation of the protective layer. As a result, an elliptically polarizing plate with excellent properties even in an oblique direction may be obtained.

As described above, the absolute value of thickness direction retardation of the third birefringent layer $Rth_3$ may be optimized in accordance with the absolute value of thickness direction retardation of the protective layer Rthp. For example, the absolute value of thickness direction retardation of the third birefringent layer $Rth_3$ is preferably 50 to 200 nm, more preferably 75 to 150 nm, and most preferably 90 to 120 nm. A thickness of the third birefringent layer providing such an absolute value may vary depending on a material or the like to be used. For example, the third birefringent layer has a thickness of preferably 0.5 to 10 μm, more preferably 0.5 to 8 μm, and most preferably 0.5 to 5 μm.

The third birefringent layer is preferably formed of a film containing a liquid crystal material fixed in homeotropic alignment. A liquid crystal material (liquid crystal compound) that may be homeotropically aligned may be a liquid crystal monomer or a liquid crystal polymer. A typical example of the liquid crystal compound is a nematic liquid crystal compound. A review on alignment techniques of such a liquid crystal compound is described in for example "Kagaku Sousetsu 44" (Hyomen No Kaishitsu, edited by chemical Society of Japan, p. 156 to 163), which is herein incorporated by reference.

An example of a liquid crystal material which may form homeotropic alignment is a side chain-type liquid crystal polymer containing: a monomer unit containing a liquid crystalline fragment sidechain (a); and a monomer unit containing a non-liquid crystalline fragment side chain (b). Such a side chain-type liquid crystal polymer may realize homeotropic alignment without use of a vertical aligner (aligning agent) or a vertical alignment film. The side chain-type liquid crystal polymer contains a monomer unit containing a non-liquid crystalline fragment side chain (b) having an alkyl chain or the like, in addition to a monomer unit containing a liquid crystalline fragment side chain (a) which is included in a normal side chain-type liquid crystal polymer. Action of the monomer unit containing a non-liquid crystalline fragment side chain (b) presumably allows development of a liquid crystal state (such as a nematic liquid crystal phase) through heat treatment, for example, without the use of a vertical aligner or a vertical alignment film, to thereby realize homeotropic alignment.

The monomer unit (a) has a side chain exhibiting nematic liquid crystallinity, and an example thereof is a monomer unit represented by the general formula (a).

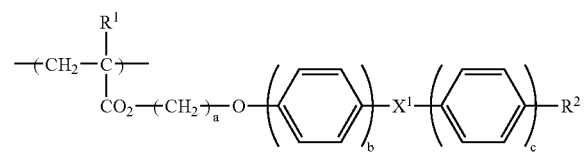

In the general formula (a): $R^1$ represents a hydrogen atom or a methyl group; a represents a positive integer of 1 to 6; $X^1$ represents a —$CO_2$— group or a —OCO— group; $R^2$ represents a cyano group, an alkoxy group having 1 to 6 carbon atoms, a fluoro group, or an alkyl group having 1 to 6 carbon atoms; and b and c each represent an integer of 1 or 2.

The monomer unit (b) has a linear side chain, and an example thereof is a monomer unit represented by the general formula (b)

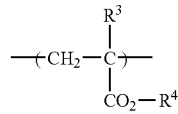

In the general formula (b): $R^3$ represents a hydrogen atom or a methyl group; and $R^4$ represents an alkyl group having 1 to 22 carbon atoms, a fluoroalkyl group having 1 to 22 carbon atoms, or a group represented by the general formula (b1).

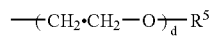

In the general formula (b1), d represents a positive integer of 1 to 6, and $R^5$ represents an alkyl group having 1 to 6 carbon atoms.

A ratio of the monomer unit (a) to the monomer unit (b) may be appropriately set depending on the purpose and the kinds of monomer units. (b)/{(a)+(b)} is preferably 0.01 to 0.8 (molar ratio), and more preferably 0.1 to 0.5 (molar ratio) because a large ratio of the monomer unit (b) often provides a side chain-type liquid crystal polymer exhibiting no liquid crystal monodomain alignment property.

Another example of a liquid crystal material which may form homeotropic alignment is a side chain-type liquid crystal polymer containing: the monomer unit containing a liquid crystalline fragment side chain (a); and a monomer unit containing a crystalline fragment side chain having an alicyclic structure (c). Such a side chain-type liquid crystal polymer may also realize homeotropic alignment without the use of a vertical aligner or a vertical alignment film. The side chain-type liquid crystal polymer contains a monomer unit containing a crystalline fragment side chain having an alicyclic structure (c), in addition to a monomer unit containing a liquid crystalline fragment side chain (a) which is included in a normal side chain-type liquid crystal polymer. Action of the monomer unit (c) presumably allows development of a liquid crystal state (such as a nematic liquid crystal phase) through heat treatment, for example, without the use of a vertical alignment film, to thereby realize homeotropic alignment.

The monomer unit (c) has a side chain exhibiting nematic liquid crystallinity, and an example thereof is a monomer unit represented by the general formula (c).

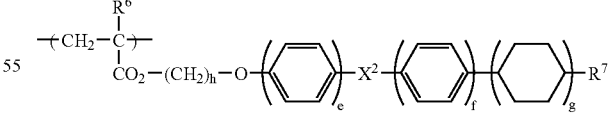

In the general formula (c): $R^6$ represents a hydrogen atom or a methyl group; h represents a positive integer of 1 to 6; $X^2$ represents a —$CO_2$— group or a —OCO— group; e and g each represent an integer of 1 or 2; f represents an integer of 0 to 2; and $R^7$ represents a cyano group or an alkyl group having 1 to 12 carbon atoms.

A ratio of the monomer unit (a) to the monomer unit (c) may be appropriately set depending on the purpose and the kinds of monomer units. (c)/{(a)+(c)} is preferably 0.01 to 0.8 (molar ratio), and more preferably 0.1 to 0.6 (molar ratio) because a large ratio of the monomer unit (c) often provides a side chain-type liquid crystal polymer exhibiting no liquid crystal monodomain alignment property.

The above-mentioned monomer units are mere examples, and the liquid crystal polymer which may form homeotropic alignment is obviously not limited to those containing the monomer units. The exemplified monomer units may be appropriately combined.

The side chain-type liquid crystal polymer has a weight average molecular weight of preferably 2,000 to 100,000. The sidechain-type liquid crystal polymer having a weight average molecular weight adjusted within the above range may perform favorably as a liquid crystal polymer. The weight average molecular weight is more preferably 2,500 to 50,000. A weight average molecular weight within the above range may provide excellent film formation property and uniform aligned state of the resultant layer.

The side chain-type liquid crystal polymer exemplified above may be prepared through copolymerization of an acrylic monomer or a methacrylic monomer corresponding to the monomer unit (a), (b), or (c). A monomer corresponding to the monomer unit (a), (b), or (c) may be synthesized through any appropriate method. Preparation of a copolymer may be performed in accordance with any appropriate polymerization method (such as a radical polymerization method, a cationic polymerization method, or an anionic polymerization method) for an acrylic monomer or the like. In the radical polymerization method, various polymerization initiators may be used. Examples of a preferred polymerization initiator include azobisisobutyronitrile and benzoyl peroxide which may decompose at an appropriate (not high and not low) temperature, to thereby start the polymerization with appropriate mechanism and speed.

Homeotropic alignment may also be formed from a liquid crystalline composition containing the side chain-type liquid crystal polymer. Such a liquid crystalline composition may contain a photopolymerizable liquid crystal compound, in addition to the side chain-type liquid crystal polymer. The photopolymerizable liquid crystal compound is a liquid crystalline compound having at least one photopolymerizable functional group (group having an unsaturated double bond such as an acryloyl group or a methacryloyl group), and preferably exhibits nematic liquid crystallinity. Specific examples of the photopolymerizable liquid crystal compound include an acrylate and a methacrylate which may also be used as the monomer unit (a). A more preferred photopolymerizable liquid crystal compound has two or more photopolymerizable functional groups for improving durability of a film to be obtained (third birefringent layer). An example of such a photopolymerizable liquid crystal compound is a crosslinking-type nematic liquid crystal monomer represented by the following formula. Further examples of the photopolymerizable liquid crystal compound include: a compound obtained by substituting a terminal "$H_2C=CR—CO_2—$" in the following formula with a vinyl ether group or an epoxy group; and a compound obtained by substituting "$—(CH_2)_m—$" and/or "$—(CH_2)_n—$" in the following formula with "$—(CH_2)_3—C^*H(CH_3)—(CH_2)_2—$" or "$—(CH_2)_2—C^*H(CH_3)—(CH_2)_3—$".

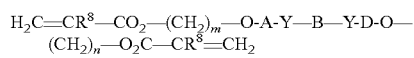

In the formula: $R^8$ represents a hydrogen atom or a methyl group; A and D each independently represent a 1,4-phenylene group or a 1,4-cyclohexylene group; each Y independently represents a —COO— group, a —OCO— group, or a —O— group; B represents a 1,4-phenylene group, a 1,4-cyclohexylene group, a 4,4'-biphenylene group, or a 4,4'-bicyclohexylene group; and m and n each independently represent an integer of 2 to 6.

The photopolymerizable liquid crystal compound may be homeotropically aligned together with the side chain-type liquid crystal polymer by developing a liquid crystal state such as a nematic liquid crystal phase through heat treatment. Then, the photopolymerizable liquid crystal compound may be polymerized or crosslinked to fix the homeotropic alignment, to thereby further improve durability of the homeotropically aligned liquid crystal film.

A ratio of the photopolymerizable liquid crystal compound to the side chain-type liquid crystal polymer in the liquid crystalline composition may be appropriately set depending on the purpose, the kinds of side chain-type liquid crystal polymer and photopolymerizable liquid crystal compound to be used, the durability of a homeotropically aligned liquid crystal film to be obtained, and the like. To be specific, a ratio of photopolymerizable liquid crystal compound: side chain-type liquid crystal polymer (weight ratio) is preferably about 0.1:1 to 30:1, more preferably 0.5:1 to 20:1, and most preferably 1:1 to 10:1.

The liquid crystalline composition may further contain a photopolymerization initiator. Any appropriate photopolymerization initiator may be employed as the photopolymerization initiator. Specific examples thereof include IRGACURE 907, IRGACURE 184, IRGACURE 651, and IRGACURE 369 (trade name, available from Ciba Specialty Chemicals). A content of the photopolymerization initiator may be adjusted within a range not disturbing homeotropic alignment property of the liquid crystalline composition in view of the kind of photopolymerizable liquid crystal compound, a mixing ratio of the liquid crystalline composition, and the like. In general, the content of the photopolymerization initiator is preferably about 0.5 to 30 parts by weight, and more preferably 0.5 to 10 parts by weight with respect to 100 parts by weight of the photopolymerizable liquid crystal compound.

A-5. Polarizer

Any suitable polarizers may be employed as the polarizer 11 in accordance with the purpose. Examples thereof include: a film prepared by adsorbing a dichromatic substance such as iodine or a dichromatic dye on a hydrophilic polymer film such as a polyvinyl alcohol-based film, a partially formalized polyvinyl alcohol-based film, or a partially saponified ethylene/vinyl acetate copolymer-based film and uniaxially stretching the film; and a polyene-based orientation film such as a dehydrated product of a polyvinyl alcohol-based film or a dechlorinated product of a polyvinyl chloride-based film. Of those, a polarizer prepared by adsorbing a dichromatic substance such as iodine on a polyvinyl alcohol-based film and uniaxially stretching the film is particularly preferred because of high polarized dichromaticity. A thickness of the polarizer is not particularly limited, but is generally about 1 to 80 μm.

The polarizer prepared by adsorbing iodine on a polyvinyl alcohol-based film and uniaxially stretching the film may be produced by, for example: immersing a polyvinyl alcohol-based film in an aqueous solution of iodine for coloring; and stretching the film to a 3 to 7 times length of the original length. The aqueous solution may contain boric acid, zinc sulfate, zinc chloride, or the like as required, or the polyvinyl alcohol-based film may be immersed in an aqueous solution of potassium iodide or the like. Further, the polyvinyl alcohol-based film may be immersed and washed in water before coloring as required.

Washing the polyvinyl alcohol-based film with water not only allows removal of contamination or an antiblocking agent on a film surface, but also provides an effect of preventing nonuniformity such as uneven coloring by swelling of the polyvinyl alcohol-based film. The stretching of the film may be performed after coloring of the film with iodine, performed during coloring of the film, or performed followed by coloring of the film with iodine. The stretching may be performed in an aqueous solution of boric acid or potassium iodide, or in a water bath.

A-6. Protective Layer

The protective layer 12 and the second protective layer 16 are each formed of any suitable film which can be used as a protective layer for a polarizer. Specific examples of a material used as a main component of the film include transparent resins such as a cellulose-based resin (such as triacetylcellulose (TAC)), a polyester-based resin, a polyvinyl alcohol-based resin, a polycarbonate-based resin, a polyamide-based resin, a polyimide-based resin, a polyether sulfone-based resin, a polysulfone-based resin, a polystyrene-based resin, a polynorbornene-based resin, a polyolefin-based resin, an acrylic resin, and an acetate-based resin. Another example thereof includes an acrylic, urethane-based, acrylic urethane-based, epoxy-based, or silicone-based thermosetting resin or UV-curing resin. Still another example thereof includes a glassy polymer such as a siloxane-based polymer. Further, a polymer film described in JP 2001-343529 A (WO 01/37007) may also be used. More specifically, the film is formed of a resin composition containing a thermoplastic resin having a substituted or unsubstituted imide group on a side chain, and a thermoplastic resin having a substituted or unsubstituted phenyl group and a nitrile group on a side chain. A specific example thereof includes a resin composition containing an alternate copolymer of isobutene and N-methylmaleimide, and an acrylonitrile/styrene copolymer. The polymer film may be an extruded product of the above-mentioned resin composition, for example. Of those, TAC, a polyimide-based resin, a polyvinyl alcohol-based resin, and a glassy polymer are preferred. TAC is especially preferred. The protective layer of such materials may be used in combination with the third birefringent layer, to thereby significantly improve circularly polarization properties in an oblique direction.

It is preferred that the protective layer be transparent and have no color. More specifically, the protective layer has a thickness direction retardation of preferably −90 nm to +90 nm, more preferably −80 nm to +80 nm, and most preferably −70 nm to +70 nm.

The protective layer has any suitable thickness as long as the preferred thickness direction retardation can be obtained. More specifically, the thickness of the protective layer is preferably 5 mm or less, more preferably 1 mm or less, particularly preferably 1 to 500 µm, and most preferably 5 to 150 µm.

B. Method of Producing Elliptically Polarizing Plate

A method of producing an elliptically polarizing plate according to an embodiment of the present invention includes: forming a first birefringent layer on a surface of a transparent protective film (T); laminating a polarizer on a surface of the transparent protective film (T); laminating a polymer film on a surface of the first birefringent layer, so as to form a second birefringent layer; and forming a third birefringent layer having a refractive index profile of nz>nx=ny on a surface of the second birefringent layer. The first birefringent layer is arranged on the opposite side against the polarizer with respect to the transparent protective film (T). The step of forming the first birefringent layer includes: applying an application liquid containing a liquid crystal material onto a substrate subjected to an alignment treatment; treating the applied liquid crystal material at a temperature at which the liquid crystal material exhibits a liquid crystal phase, so as to form the first birefringent layer on the substrate; and transferring the first birefringent layer formed on the substrate onto a surface of the transparent protective film (T). A ratio $Rth_3/Rthp$ of an absolute value of thickness direction retardation of the third birefringent layer $Rth_3$ to an absolute value of thickness direction retardation of the transparent protective film (T) Rthp is preferably 1.1 to 4.0. According to such a production method, for example, the elliptically polarizing plate as shown in FIG. 1A can be obtained.

A method of producing an elliptically polarizing plate according to another embodiment of the present invention includes: forming a third birefringent layer having a refractive index profile of nz>nx=ny on a surface of a transparent protective film (T); laminating a polarizer on a surface of the transparent protective film (T); forming a first birefringent layer on a surface of the third birefringent layer; and laminating a polymer film on a surface of the first birefringent layer, so as to form a second birefringent layer. The third birefringent layer is arranged on the opposite side against the polarizer with respect to the transparent protective film (T). The step of forming the first birefringent layer includes: applying an application liquid containing a liquid crystal material onto a substrate subjected to an alignment treatment; treating the applied liquid crystal material at a temperature at which the liquid crystal material exhibits a liquid crystal phase, so as to form the first birefringent layer on the substrate; and transferring the first birefringent layer formed on the substrate onto a surface of the third birefringent layer. A ratio $Rth_3/Rthp$ of an absolute value of thickness direction retardation of the third birefringent layer $Rth_3$ to an absolute value of thickness direction retardation of the transparent protective film (T) Rthp is preferably 1.1 to 4.0. According to such a production method, for example, the elliptically polarizing plate as shown in FIG. 1B can be obtained.

The order of the steps may be appropriately changed in accordance with a laminated structure of the target elliptically polarizing plate. For example, the step of laminating the polarizer may be performed after the step of forming or laminating any one of the birefringent layers. Hereinafter, description is given of each of the steps.

B-1. Step of Forming First Birefringent Layer

A first birefringent layer is formed on the surface of a transparent protective film (T). A detailed steps of forming the first birefringent layer is as follows.

First of all, an application liquid containing a liquid crystal material is applied onto a substrate which has been subjected to the alignment treatment.

Any appropriate substrate may be employed as long as an appropriate first birefringent layer for the present invention is obtained. Specific examples thereof include a glass substrate, a metal foil, a plastic sheet, and a plastic film. A vertical alignment film needs not be provided on the substrate. Any appropriate plastic film may be employed as the plastic film. Specific examples thereof include films formed of transparent polymers including: polyester-based polymers such as polyethylene terephthalate and polyethylene naphthalate; cellulose-based polymers such as diacetylcellulose and triacetylcellulose; polycarbonate-based polymers; and acrylic polymers such as polymethylmethacrylate. Further examples of the plastic film include films formed of transparent polymers including: styrene-based polymers such as polystyrene and an acrylonitrile/styrene copolymer; olefin-based polymers such as polyethylene, polypropylene, polyolefin having a cyclic or norbornene structure, and an ethylene/propylene copolymer; vinyl chloride-based polymers; and amide-based polymers such as nylon and aromatic polyamide. Further examples of the plastic film include films formed of transparent polymers including imide-based polymers, sulfone-based polymers, polyethersulfone-based polymers, polyetheretherketone-based polymers, polyphenylenesulfide-based polymers, vinyl alcohol-based polymers, vinylidene chloride-based polymers, vinyl butyral-based polymers, arylate-based polymers, polyoxymethylene-based polymers, epoxy-based polymers, and blended products thereof. Of those, a plastic film formed of polyethylene terephthalate (PET) is preferably used.

The thickness of the substrate is preferably 20 to 100 μm, more preferably 30 to 90 μm, and most preferably 30 to 80 μm. The thickness within the above range can provide a substrate having sufficient strength to support very thin first birefringent layer in the step of laminating, and can suitably maintain operation property such as sliding property and roll traveling property.

Any suitable alignment treatment may be employed as the alignment treatment for the substrate as long as the suitable first birefringent layer of the present invention can be obtained. Specific examples of the alignment treatment include rubbing treatment, oblique deposition method, stretching treatment, photoalignment treatment, magnetic field alignment treatment, and electrical field alignment treatment. The rubbing treatment is preferred.

The alignment direction of the alignment treatment is set to be a direction at a predetermined angle with respect to the absorption axis of the polarizer when the polarizer is laminated. The alignment direction is substantially the same as the direction of the slow axis of the first birefringent layer 12 as described below. Thus, the predetermined angle is preferably +8° to +38° or −8° to −38°, more preferably +13° to +33° or −13° to −33°, particularly preferably +19° to +29° or −19° to −29°, especially preferably +21° to +27° or −21° to −27°, and most preferably +23° to +24° or −23° to −24°.

An application liquid containing a liquid crystal material which forms the first birefringent layer is applied onto the substrate which has been subjected to the alignment treatment. Then, the liquid crystal material in the application liquid is aligned to form the first birefringent layer. The liquid crystal material is aligned through treatment at a temperature at which the liquid crystal material exhibits a liquid crystal phase. The temperature may be appropriately determined in accordance with the type of liquid crystal material used. The treatment at such a temperature allows the liquid crystal material to be in a liquid crystal state, and the liquid crystal material is aligned in accordance with the alignment direction of the surface of the substrate. Thus, birefringence is caused in the layer formed through application, to thereby form the first birefringent layer.

The application liquid containing a liquid crystal material is prepared by dissolving or dispersing a liquid crystal material in an appropriate solvent.

Any suitable solvents which may dissolve or disperse the liquid crystal material may be employed as the solvent. The type of solvent to be used may be appropriately selected in accordance with the type of liquid crystal material or the like. Specific examples of the solvent include: halogenated hydrocarbons such as chloroform, dichloromethane, carbon tetrachloride, dichloroethane, tetrachloroethane, methylene chloride, trichloroethylene, tetrachloroethylene, chlorobenzene, and orthodichlorobenzene; phenols such as phenol, p-chlorophenol, o-chlorophenol, m-cresol, o-cresol, and p-cresol; aromatic hydrocarbons such as benzene, toluene, xylene, mesitylene, methoxybenzene, and 1,2-dimethoxybenzene; ketone-based solvents such as acetone, methyl ethyl ketone (MEK), methyl isobutyl ketone, cyclohexanone, cyclopentanone, 2-pyrrolidone, and N-methyl-2-pyrrolidone; ester-based solvents such as ethyl acetate, butyl acetate, and propyl acetate; alcohol-based solvents such as t-butyl alcohol, glycerin, ethylene glycol, triethylene glycol, ethylene glycol monomethyl ether, diethylene glycol dimethyl ether, propylene glycol, dipropylene glycol, and 2-methyl-2,4-pentanediol; amide-based solvents such as dimethylformamide and dimethylacetamide; nitrile-based solvents such as acetonitrile and butyronitrile; ether-based solvents such as diethyl ether, dibutyl ether, tetrahydrofuran, and dioxane; and carbon disulfide, ethyl cellosolve, butyl cellosolve, and ethyl cellosolve acetate. Of those, toluene, xylene, mesitylene, MEK, methyl isobutyl ketone, cyclohexanone, ethyl cellosolve, butyl cellosolve, ethyl acetate, butyl acetate, propyl acetate, and ethyl cellosolve acetate are preferred. The solvent may be used alone or in combination of two or more types thereof.

A content of the liquid crystal material in the liquid crystal composition (application liquid) may be appropriately determined in accordance with the type of liquid crystal material, the thickness of the target layer, and the like. More specifically, the content of the liquid crystal material is preferably 5 to 50 wt %, more preferably 10 to 40 wt %, and most preferably 15 to 30 wt %.

The liquid crystal composition (application liquid) may further contain any suitable additives as required. Specific examples of the additive include a polymerization initiator and a crosslinking agent. The additive is particularly preferably used when a liquid crystal monomer is used as the liquid crystal material. Specific examples of the polymerization initiator include benzoylperoxide (BPO) and azobisisobutyronitrile (AIBN). Specific examples of the crosslinking agent include an isocyanate-based crosslinking agent, an epoxy-based crosslinking agent, and a metal chelate crosslinking agent. Such additive may be used alone or in combination of two or more thereof. Specific examples of other additives include an antioxidant, a modifier, a surfactant, a dye, a pigment, a discoloration inhibitor, and a UV absorber. Such additive may also be used alone or in combination of two or more thereof. Examples of the antioxidant include a phenol-based compound, an amine-based compound, an organic sulfur-based compound, and a phosphine-based compound. Examples of the modifier include glycols, silicones, and alcohols. The surfactant is used for smoothing a surface of an optical film (that is, the first birefringent layer to be formed), for example. Specific examples thereof include a silicone-based surfactant, an acrylic surfactant, and a fluorine-based surfactant.

An application amount of the application liquid may be appropriately determined in accordance with a concentration of the application liquid, the thickness of the target layer, and the like. In a case where the concentration of the liquid crystal material is 20 wt % in the application liquid, the application amount is preferably 0.03 to 0.17 ml, more preferably 0.05 to 0.15 ml, and most preferably 0.08 to 0.12 ml per 100 cm$^2$ of the substrate.

Any suitable application methods may be employed, and specific examples thereof include roll coating, spin coating, wire bar coating, dip coating, extrusion, curtain coating, and spray coating.

Next, the liquid crystal material forming the first birefringent layer is aligned in accordance with the alignment direction of the surface of the substrate. The liquid crystal material is aligned through treatment at a temperature at which the liquid crystal material exhibits a liquid crystal phase. The temperature may be appropriately determined in accordance with the type of liquid crystal material used. The treatment at such a temperature allows the liquid crystal material to be in a liquid crystal state, and the liquid crystal material is aligned in accordance with the alignment direction of the surface of the transparent protective film. Thus, birefringence is caused in the layer formed through application, to thereby form the first birefringent layer.

A treatment temperature may be appropriately determined in accordance with the type of liquid crystal material. More specifically, the treatment temperature is preferably 40 to 120° C., more preferably 50 to 100° C., and most preferably 60 to 90° C. A treatment time is preferably 30 seconds or more, more preferably 1 minute or more, particularly preferably 2 minutes or more, and most preferably 4 minutes or more. The treatment time of less than 30 seconds may provide an insufficient liquid crystal state of the liquid crystal material. Meanwhile, the treatment time is preferably 10 minutes or less, more preferably 8 minutes or less, and most preferably 7 minutes or less. The treatment time exceeding 10 minutes may cause sublimation of additives.

In a case where the liquid crystal monomer as described above is used as the liquid crystal material, the layer formed through the application is preferably subjected to polymerization treatment or crosslinking treatment. The polymerization treatment allows the liquid crystal monomer to be polymerized and to be fixed as a repeating unit of a polymer molecule. The crosslinking treatment allows the liquid crystal monomer to form a three-dimensional network structure and to be fixed as a part of the network structure. As a result, the alignment state of the liquid crystal material is fixed. The polymer or three-dimensional structure formed through polymerization or crosslinking of the liquid crystal monomer is "non-liquid crystal". Thus, the formed first birefringent layer will not undergo phase transition into a liquid crystal phase, a glass phase, or a crystal phase by change in temperature, which is specific to a liquid crystal molecule.

A specific procedure for the polymerization treatment or crosslinking treatment may be appropriately selected in accordance with the type of polymerization initiator or crosslinking agent to be used. For example, in a case where a photopolymerization initiator or a photocrosslinking agent is used, photoirradiation may be performed. In a case where a UV polymerization initiator or a UV crosslinking agent is used, UV irradiation may be performed. The irradiation time, irradiation intensity, total amount of irradiation, and the like of light or UV light may be appropriately set in accordance with the type of liquid crystal material, the type of substrate, the type of alignment treatment, desired characteristics for the first birefringent layer, and the like.

Next, the first birefringent layer formed on the substrate is transferred onto a surface of the transparent protective film (T). A method of transferring the first birefringent layer is not particularly limited. For example, the first birefringent layer supported by the substrate and the transparent protective film (T) are attached together through an adhesive. The transferring method can provide an elliptically polarizing plate having excellent adhesiveness between adjacent films (layers) at very high efficiency.

Specific examples of the above-mentioned adhesive include a setting adhesive. Specific examples of the setting adhesive include a photosetting adhesive such as an ultravioletsetting adhesive, a moistsetting adhesive, or a thermosetting adhesive. Specific examples of the thermosetting adhesive include a thermosetting resin adhesive such as epoxy resin adhesive, isocyanate resin adhesive, or polyimide resin adhesive. Specific examples of the moistsetting adhesive include a moistsetting isocyanate resin adhesive. The moistsetting adhesive (especially the moistsetting isocyanate resin adhesive) is preferred. The moistsetting adhesive can be cured by reacting with moisture in the air, absorbed water on a surface of an adherend, active hydrogen group such as hydroxyl group or carboxylic group. Thus, the moistsetting adhesive can be cured only by being left without any treatment after coating, thereby to provide excellent operability. Furthermore, as heating is not needed for curing, the first birefringent layer and the transparent protective film (T) are not heated when they are attached together. As a result, since no heat-shrinkage is caused, problems such as crack at the time of laminating can be remarkably prevented even in the case that the first birefringent layer and the transparent protective film (T) are very thin. Incidentally, the isocyanate resin adhesive is a general term including polyisocyanate resin adhesive and polyurethane resin adhesive.

As the setting adhesive, for example, a commercially available adhesive can be used. Alternatively, a setting resin adhesive solution (or dispersion) can be prepared by dissolving or dispersing any of the above-mentioned setting resins with a solvent. When the setting resin adhesive solution (or dispersion) is prepared, the solid content of the setting resin is preferably 10 to 80 wt %, more preferably 20 to 65 wt %, more preferably 25 to 65 wt %, and most preferably 30 to 50 wt %. Any suitable solvent may be employed as solvent in accordance with the type of the setting resin. Specific examples of the solvent include: ethyl acetate, methyl ethyl ketone, methyl isobutyl ketone, toluene, and xylene. The solvent may be used alone or in combination.

An application amount of the adhesive may be appropriately determined in accordance with the purpose. For example, the application amount is preferably 0.3 to 3 ml, more preferably 0.5 to 2 ml, and most preferably 1 to 2 ml per 1 $cm^2$ of the first birefringent layer or the transparent protective film. After the application, the solvent in the adhesive can be volatilized by air drying or heated-air drying as required. The thickness of the adhesive layer formed by the above-mentioned process is preferably 0.1 to 20 µm, more preferably 0.5 to 15 µm, and most preferably 1 to 10 µm. Indentation hardness (Microhardness) of the adhesive layer is preferably 0.1 to 0.5 GPa, more preferably 0.2 to 0.5 GPa, and most preferably 0.3 to 0.4 GPa. Indentation hardness can be converted into Vickers hardness because it is well-known that the indentation hardness correlates to Vickers hardness. Indentation hardness can be calculated from Indentation depth and Indentation load with Thin-film hardness meter (for example, trade name: MH4000 or MHA-400 manufactured by NEC Corporation).

Finally, the substrate is peeled off from the first birefringent layer. Thus, a laminate of the first birefringent layer and the transparent protective film is completed.

B-2. Step of Laminating Polarizer

The polarizer is laminated on the surface of a transparent protective film (T). As described above, the polarizer is laminated at an appropriate point in time in the production method of the present invention. For example, the polarizer may be laminated on the transparent protective layer (T) in advance, may be laminated after the first birefringent layer is formed, may be laminated after the second birefringent layer is formed, or may be laminated after the third birefringent layer is formed.

Any suitable lamination methods (such as adhesion) may be employed as a method of laminating the transparent protective film (T) and the polarizer. The adhesion may be performed by using any suitable adhesive or pressure-sensitive adhesive. The type of adhesive or pressure-sensitive adhesive may be appropriately selected in accordance with the type of adherend (that is, transparent protective film and polarizer). Specific examples of the adhesive include: acrylic, vinyl alcohol-based, silicone-based, polyester-based, polyurethane-based, and polyether-based polymer adhesives; isocyanate-based adhesives; and rubber-based adhesives. Specific examples of the pressure-sensitive adhesive include acrylic, vinyl alcohol-based, silicone-based, polyester-based, polyurethane-based, polyether-based, isocyanate-based, and rubber-based pressure-sensitive adhesives.

A thickness of the adhesive or pressure-sensitive adhesive is not particularly limited, but is preferably 10 to 200 nm, more preferably 30 to 180 nm, and most preferably 50 to 150 nm.

According to the production method of the present invention, the slow axis of the first birefringent layer may be set in the desired direction in the alignment treatment for the substrate. Thus, a long polarizing film (polarizer) stretched in a longitudinal direction (that is, film having an absorption axis in the longitudinal direction) can be used. In other words, a long first birefringent layer (first birefringent layer formed on the substrate) which has been subjected to the alignment treatment at a predetermined angle with respect to its longitudinal direction, a long transparent protective film (T), and a long polarizing film (polarizer) may be continuously attached together while the respective longitudinal directions being arranged in the same direction. Thus, an elliptically polarizing plate can be obtained at very high production efficiency. According to the method of the present invention, the transparent protective film need not be cut out obliquely with respect to its longitudinal direction (stretching direction) for lamination. As a result, angles of optical axes do not vary with respect to every cut-out film, resulting in an elliptically polarizing film without variation in quality with respect to every product. Further, no wastes are produced by cutting of the film, and the elliptically polarizing plate can be obtained at low cost and production of a large polarizing plate is facilitated. The direction of the absorption axis of the polarizer is substantially parallel to a longitudinal direction of the long film.

B-3. Step of Forming Second Birefringent Layer

Further, the second birefringent layer is formed on the surface of the first birefringent layer. In general, the second birefringent layer is formed by laminating the polymer film as described above on the surface of the first birefringent layer. The polymer film is preferably a stretched film. A lamination method is not particularly limited, and any suitable adhesive or pressure-sensitive adhesive (such as an adhesive or pressure-sensitive adhesive described above) is used for lamination.

Alternatively, as described above, a resin composition containing polymerizable liquid crystal and a chiral agent is applied onto any suitable substrate, and the whole is heated to a temperature at which the polymerizable liquid crystal exhibits a liquid crystal state. Thus, the polymerizable liquid crystal is aligned in a twisted state (more specifically, by forming a cholesteric structure) by the chiral agent. The polymerizable liquid crystal is polymerized in this state, to thereby provide a film having the fixed cholesteric structure. The film is transferred onto the surface of the first birefringent layer from the substrate, to thereby form the second birefringent layer 13.

B-4. Step of Forming Third Birefringent Layer

Further, the third birefringent layer is formed on the surface of the second birefringent layer. In general, the third birefringent layer is formed by laminating the film containing a liquid crystal material fixed in homeotropic alignment as described in the section A-4 on the surface of the second birefringent layer. The film containing a liquid crystal material fixed in homeotropic alignment is preferably formed by: applying the liquid crystal material (a liquid crystal monomer or a liquid crystal polymer) and the liquid crystalline composition as described in the section A-4 on a substrate; homeotropically aligning the liquid crystal material and the liquid crystalline composition each exhibiting liquid crystal phase; and fixing the liquid crystal material and the liquid crystalline composition while the homeotropic alignment is maintained. Hereinafter, a specific procedure for production of the film will be described.

Any appropriate substrate may be employed as the substrate. Specific examples thereof include a glass substrate, a metal foil, a plastic sheet, and a plastic film. The substrate has a thickness of generally about 10 to 1,000 µm. A vertical alignment film needs not be provided on the substrate.

Any appropriate plastic film may be employed as long as the film does not change at a temperature for aligning the liquid crystal material. Specific examples thereof include films formed of transparent polymers including: polyester-based polymers such as polyethylene terephthalate and polyethylene naphthalate; cellulose-based polymers such as diacetylcellulose and triacetylcellulose; polycarbonate-based polymers; and acrylic polymers such as polymethylmethacrylate. Further examples of the plastic film include films formed of transparent polymers including: styrene-based polymers such as polystyrene and an acrylonitrile/styrene copolymer; olefin-based polymers such as polyethylene, polypropylene, polyolefin having a cyclic or norbornene structure, and an ethylene/propylene copolymer; vinyl chloride-based polymers; and amide-based polymers such as nylon and aromatic polyamide. Further examples of the plastic film include films formed of transparent polymers including imide-based polymers, sulfone-based polymers, polyethersulfone-based polymers, polyetheretherketone-based polymers, polyphenylenesulfide-based polymers, vinyl alcohol-based polymers, vinylidene chloride-based polymers, vinyl butyral-based polymers, arylate-based polymers, polyoxymethylene-based polymers, epoxy-based polymers, and blended products thereof. Of those, a plastic film formed of triacetylcellulose, polycarbonate, norbornene-based polyolefin, or the like with high hydrogen bonding property and used as an optical film is preferably used. An example of the metal foil includes an aluminum foil.

The substrate may be provided with any appropriate binder layer and anchor coat layer in the order given from a substrate side. Specific examples of a material forming the binder layer include a coupling agent (such as a silane coupling agent, a titanium coupling agent, or a zirconium coupling agent) and an organic primer. An example of a material forming the anchor coat layer includes a metal alkoxide. The binder layer and the anchor coat layer may be formed through any appropriate method.

Examples of a method of applying the liquid crystal material (liquid crystal monomer or liquid crystal polymer) or liquid crystalline composition on the substrate include: a solution application method involving use of a solution prepared by dissolving the liquid crystal material or liquid crystalline composition in a solvent; and a melt application method involving use of a melt prepared by melting of the liquid crystal material or liquid crystalline composition. Of those, the solution application method is preferred because the homeotropic alignment may be realized precisely and easily.

Any appropriate solvent capable of dissolving the liquid crystal material or liquid crystalline composition may be employed as the solvent used for preparing the solution for solution application. Specific examples of the solvent include: halogenated hydrocarbons such as chloroform, dichloromethane, dichloroethane, tetrachloroethane, trichloroethylene, tetrachloroethylene, and chlorobenzene; phenols such as phenol and p-chlorophenol; aromatic hydrocarbons such as benzene, toluene, xylene, methoxybenzene, and 1,2-dimethoxybenzene; and others such as acetone, ethyl acetate, tert-butyl alcohol, glycerin, ethylene glycol, triethylene glycol, ethylene glycol monomethyl ether, diethylene glycol dimethyl ether, ethyl cellosolve, butyl cellosolve, 2-pyrrolidone, N-methyl-2-pyrrolidone, pyridine, triethylamine, tetrahydrofuran, dimethylformaide, dimethylacetamide, dimethylsulfoxide, acetonitrile, butyronitrile, carbon disulfide, and cyclohexanone. A concentration of the solution may vary depending on the kind (solubility) of liquid crystal material or the like to be used, an intended thickness, and the like. To be specific, a concentration of the solution is preferably 3 to 50 wt %, and more preferably 7 to 30 wt %.

Examples of a method of applying the solution on the substrate (anchor coat layer) include roll coating, gravure coating, spin coating, and bar coating. Of those, gravure coating and bar coating are preferred for allowing uniform application across a large area. After the application of the solution, the solvent is removed, to thereby form a liquid crystal material layer or liquid crystalline composition layer on the substrate. Conditions for removing the solvent are not particularly limited as long as the solvent can be substantially removed and the liquid crystal material layer or liquid crystalline composition layer does not fluidize or flow off from the substrate. In general, the solvent is removed by drying at room temperature, drying in a drying furnace, heating on a hot plate, or the like.

Next, the liquid crystal material layer or liquid crystalline composition layer formed on the substrate is converted into a liquid crystal state and homeotropically aligned. For example, heat treatment is performed such that the liquid crystal material or liquid crystalline composition exhibits a liquid crystal state, and the liquid crystal material layer or liquid crystalline composition layer in the liquid crystal state is homeotropically aligned. The heat treatment may be performed in the same manner as in the above-mentioned drying method. A heat treatment temperature may vary depending on the kind of liquid crystal material or liquid crystalline composition to be used and the kind of substrate. To be specific, the heat treatment temperature is preferably 60 to 300° C., more preferably 70 to 200° C., and most preferably 80 to 150° C. A heat treatment time may also vary depending on the kind of liquid crystal material or liquid crystalline composition and the kind of substrate to be used. To be specific, the heat treatment time is preferably 10 seconds to 2 hours, more preferably 20 seconds to 30 minutes, and most preferably 30 seconds to 10 minutes. A heat treatment time of shorter than 10 seconds may inhibit sufficient formation of homeotropic alignment. A heat treatment time of longer than 2 hours often inhibits further formation of homeotropic alignment and thus is not preferred in view of workability and productivity.

After completion of the heat treatment, a cooling operation is performed. The cooling operation may be performed by placing the homeotropically aligned liquid crystal film subjected to heat treatment from a heated atmosphere in the heat treatment operation to room temperature. Further, the cooling operation may involve forced cooling such as air cooling and water cooling. The homeotropically aligned liquid crystal film is cooled to a temperature equal to or lower than a glass transition temperature of the liquid crystal material, so as to be fixed in homeotropic alignment.

In the case where the liquid crystalline composition is used, the fixed homeotropically aligned liquid crystal film as described above may be subjected to photoirradiation or UV irradiation for polymerizing or crosslinking a photopolymerizable liquid crystal compound to fix the photopolymerizable liquid crystal compound, to thereby further improve the durability of the film. For example, conditions for UV irradiation preferably include an inert gas atmosphere for sufficiently accelerating a polymerization reaction or a crosslinking reaction. In general, a high-pressure mercury UV lamp with an illuminance of about 80 to 160 mW/cm$^2$ is used as UV irradiation means. Further, other lamps such as a metal halide UV lamp and an incandescent lamp may be used. During UV irradiation, a temperature is preferably adjusted such that a surface temperature of the liquid crystal layer remains within a temperature range in which the liquid crystal layer exhibits a liquid crystal state. Examples of a method of adjusting the temperature include: use of a cold mirror; cooling treatment such as water cooling; and increase of line speed.

In this way, a thin film of the liquid crystal material or liquid crystalline composition is formed and fixed while its homeotropic alignment is maintained, to thereby obtain a homeotropically aligned liquid crystal film. The film (eventually, the third birefringent layer) is laminated on the surface of the second birefringent layer through an adhesive or pressure sensitive adhesive, to thereby obtain an elliptically polarizing plate of the present invention.

B-5. Case where First Birefringent Layer is Formed on Surface Other than Surface of Protective Layer (Transparent Protective Film)

As described by referring to FIG. 1B, for example, the first birefringent layer may be formed on a surface other than that of the protective layer (the transparent protective layer) (in FIG. 1B, the first birefringent layer is formed on the surface of the third birefringent layer).

B-6. Specific Production Procedure

An example of a specific procedure for the production method of the present invention will be described with reference to FIGS. 3 to 8. In FIGS. 3 to 8, reference numerals 111, 111', 112, 112', 113, 114, 115, 116, 117, 118, 118', 119, and 119' each represent a roll for rolling a film and/or laminate forming each layer.

First, a long polymer film is prepared as a raw material for a polarizer, and is colored, stretched, and the like as described above. The long polymer film is stretched continuously in a longitudinal direction. In this way, as shown in a perspective view of FIG. 3, the long polarizer 11 having an absorption axis in a longitudinal direction (stretching direction: direction of arrow A) is obtained.

Figure 4A:
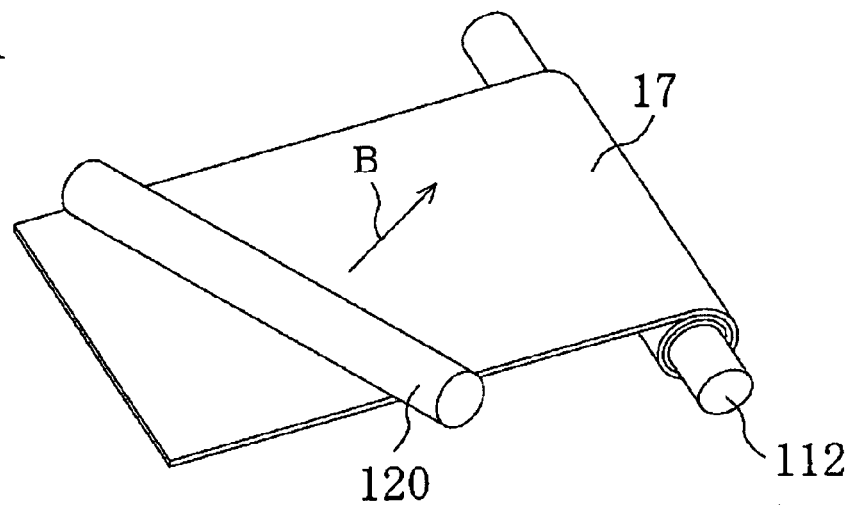
FIG. 4 is a perspective view showing another step in the example of a method of producing an elliptically polarizing plate according to the present invention.
Figure 4B:
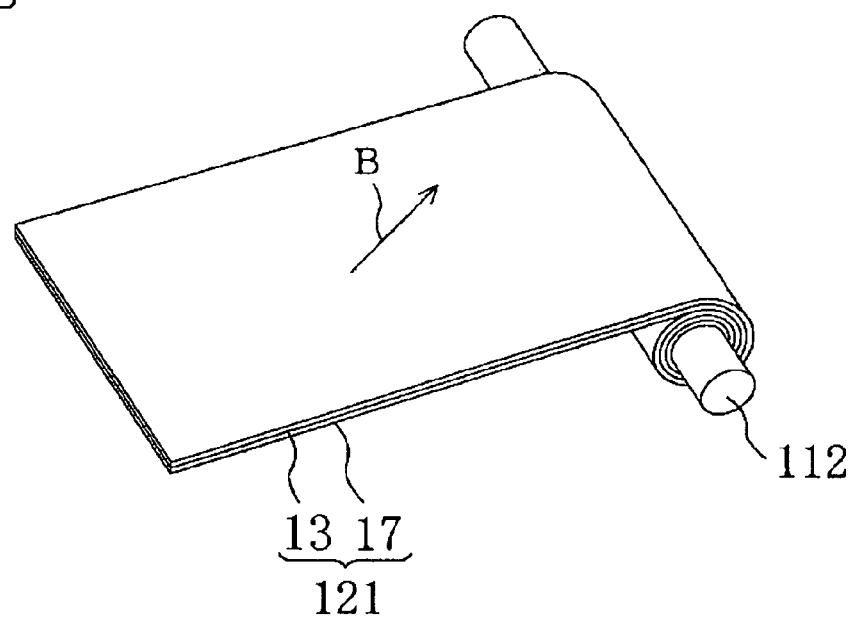

Meanwhile, as shown in a perspective view of FIG. 4A, the long substrate 17 is prepared, and a surface of the film is subjected to rubbing treatment by using a rubbing roll 120. At this time, a rubbing direction is in a direction at a predetermined angle with respect to a longitudinal direction of the transparent protective film 12 such as +8° to +38° or −8° to −38°. Next, as shown in a perspective view of FIG. 4B, the first birefringent layer 13 is formed on the substrate 17 which has been subjected to the rubbing treatment as described above. The first birefringent layer 13 has a liquid crystal material aligned along the rubbing direction, and the direction of its slow axis is in substantially the same direction (direction of arrow B) as the rubbing direction of the substrate 17.

Figure 5A:
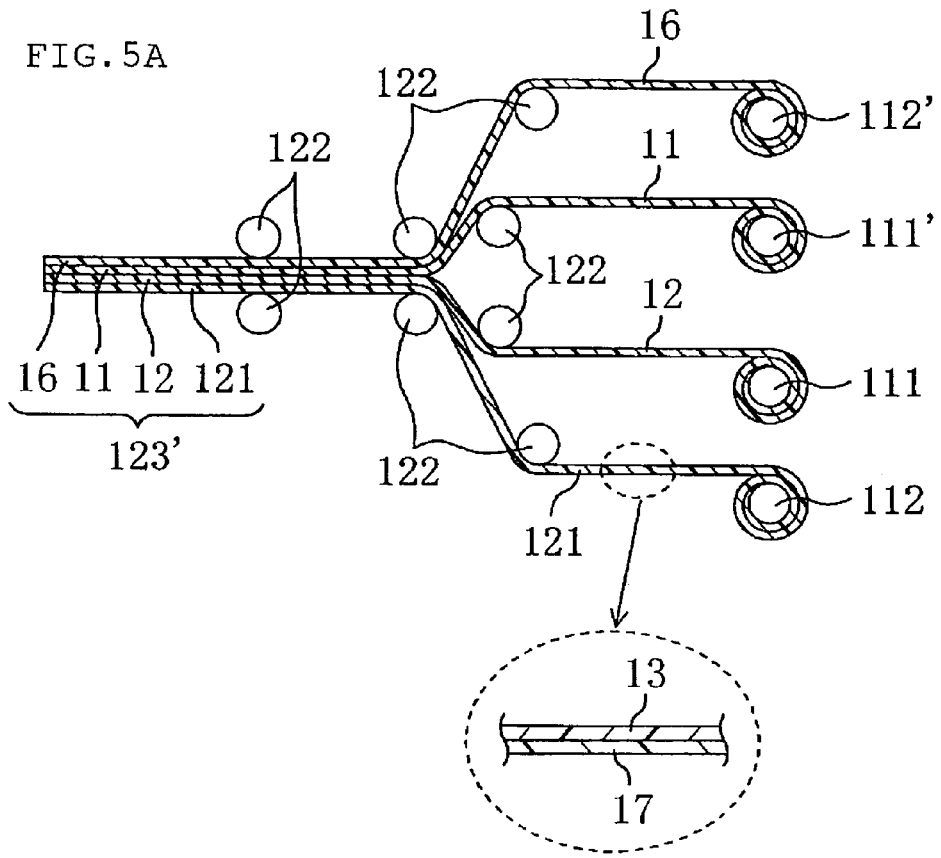
FIG. 5 is a schematic view showing still another step in the example of a method of producing an elliptically polarizing plate according to the present invention.

Next, as shown in a schematic diagram of FIG. 5A, the polarizer 11, the transparent protective film (protective layer) 12, and a laminate 121 of the first birefringent layer 13 and the substrate 17 are delivered in a direction of an arrow, and are attached together by using an adhesive or the like (not shown) while the respective longitudinal directions being arranged in the same direction. In FIG. 5A, reference numeral 122 represents a guide roll for attaching together the films (the same also applies in FIGS. 6 to 8). Preferably, the second transparent protective film (protective layer) 16 can be attached on the opposite side of the polarizer 11 with respect to the transparent protective film (protective layer) 12, so as to obtain a laminate 123'.

Figure 5B:
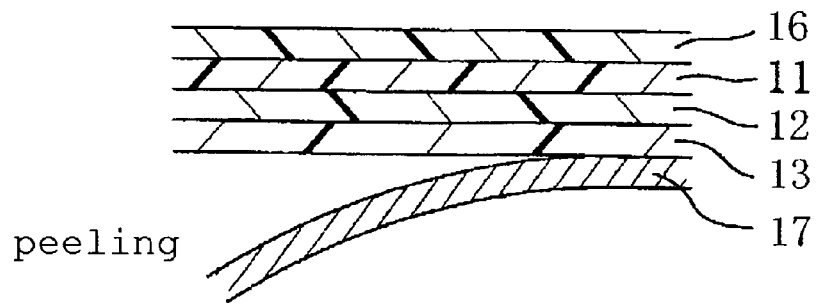

Next, as shown in FIG. 5B, the substrate 17 is peeled off from the laminate 123' (of the second transparent protective film (protective layer) 16, the polarizer 11, the transparent protective film (protective layer) 12, the first birefringent layer 13, and the substrate 17), so as to obtain the laminate 123 (of the second transparent protective film (protective layer) 16, the polarizer 11, the transparent protective film (protective layer) 12, and the first birefringent layer 13).

Figure 6:
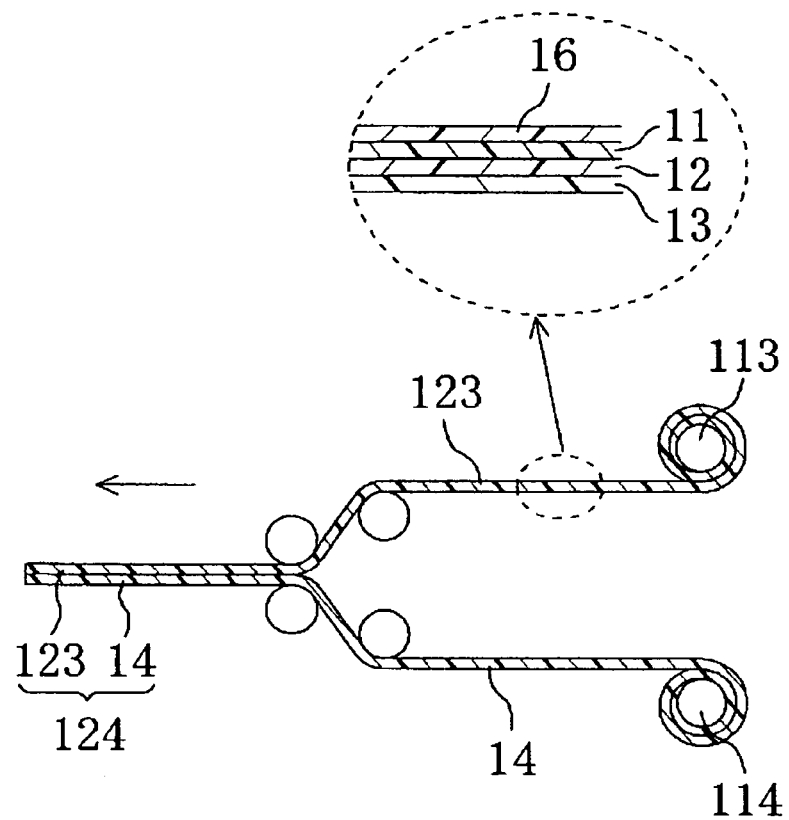
FIG. 6 is a schematic view showing still another step in the example of a method of producing an elliptically polarizing plate according to the present invention.

As shown in a schematic diagram of FIG. 6, the long second birefringent layer 14 is prepared, and the long second birefringent layer 14 and a laminate 123 (of the second transparent protective film (protective layer) 16, the polarizer 11, the transparent protective film (protective layer) 12, and the first birefringent layer 13) are delivered in a direction of an arrow, and are attached together by using an adhesive or the like (not shown) while the respective longitudinal directions are arranged in the same direction. The second birefringent layer may be formed of a stretched polymer film as described above, and its slow axis may be appropriately determined in accordance with a stretching method (stretching direction or the like). In the present invention, the slow axis direction of the first birefringent layer may be set freely through alignment treatment of the transparent protective film as described above. Thus, a general stretched polymer film subjected to transverse stretching in a direction perpendicular to a longitudinal direction may be used as the second birefringent layer, for example, to thereby facilitate treatment.

Figure 7A:
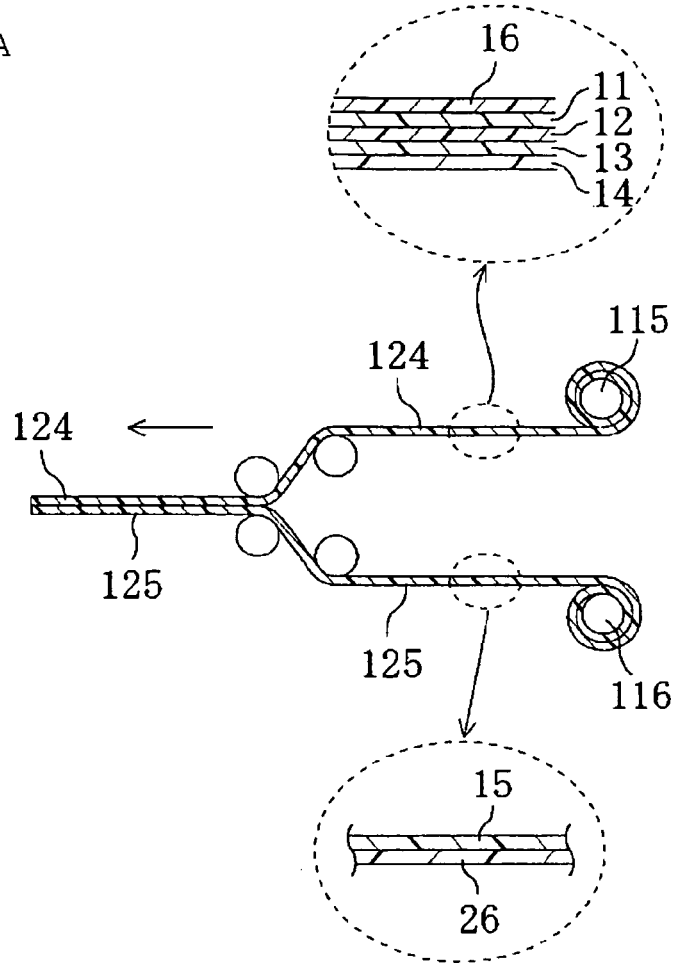
FIG. 7 is a schematic view showing still another step in the example of a method of producing an elliptically polarizing plate according to the present invention.
Figure 7B:
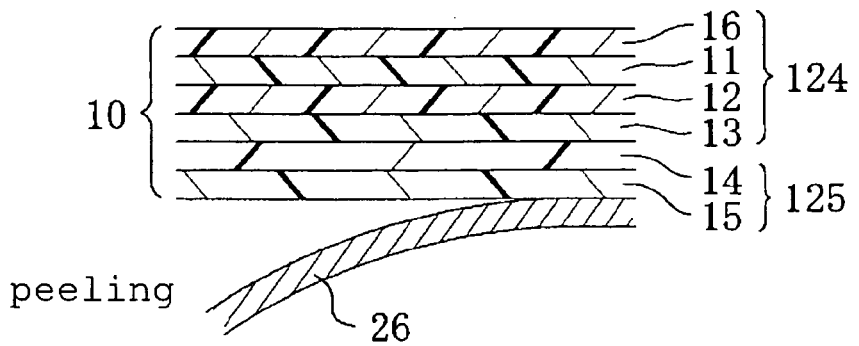

As shown in a schematic diagram of FIG. 7A, a laminate 125 (formed through application of the third birefringent layer 15 on a substrate 26) is prepared. The laminate 125 and the laminate 124 (of the second transparent protective film (protective layer) 16, the polarizer 11, the transparent protective film (protective layer) 12, the first birefringent layer 13, and the second birefringent layer 14) are delivered in a direction of an arrow, and are attached together by using an adhesive or the like (not shown) while the respective longitudinal directions are arranged in the same direction. Finally, as shown in FIG. 7B, the substrate 26 is peeled off from the attached laminates.

As described above, the elliptically polarizing plate 10 of the present invention is obtained.

Another example of a specific procedure for the production method of the present invention will be described.

Figure 3:
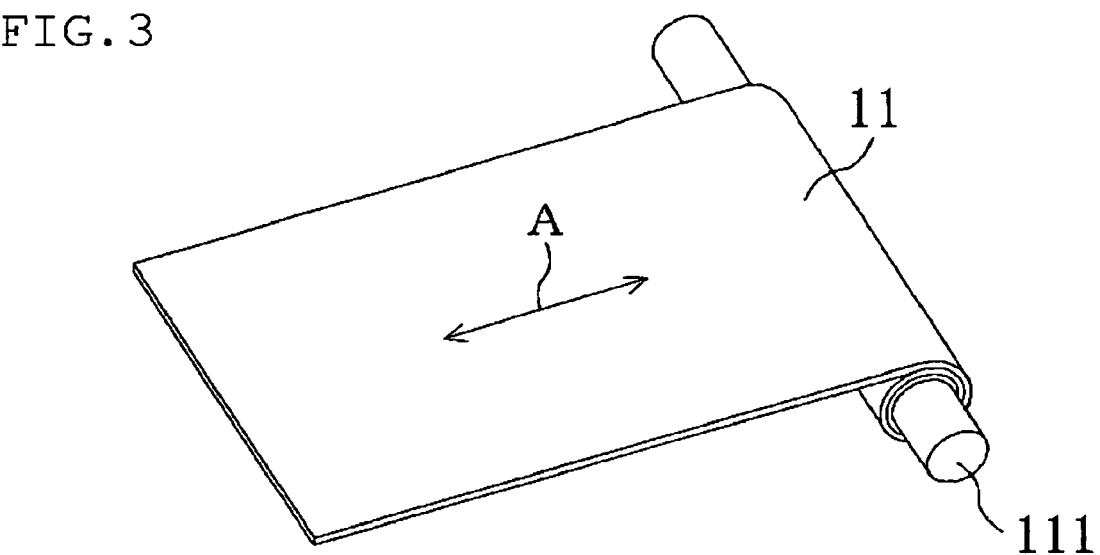
FIG. 3 is a perspective view showing a step in an example of a method of producing an elliptically polarizing plate according to the present invention.

As described above, the long polarizer 11 is obtained as shown in a perspective view of FIG. 3. Further, the laminate 121 of the first birefringent layer 13 and the substrate 17 is obtained, as shown in a perspective view of FIGS. 4A and 4B.

Figure 8A:
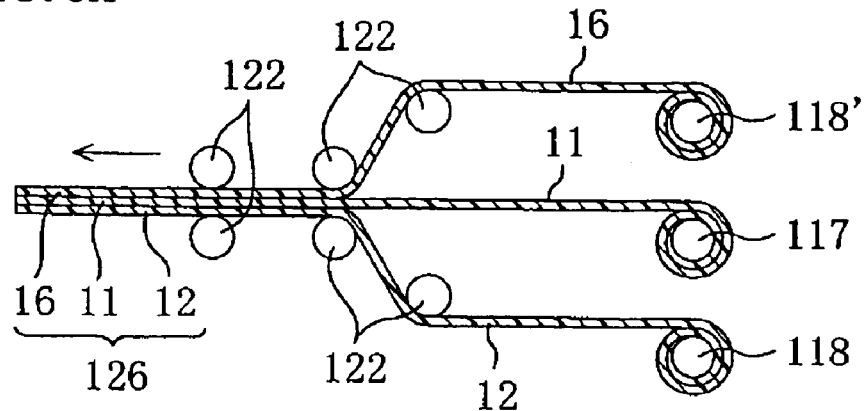
FIG. 8 is a schematic view showing still another step in the example of a method of producing an elliptically polarizing plate according to the present invention.

Next, as shown in a schematic diagram of FIG. 8A, the polarizer 11, the transparent protective film (protective layer) 12, and the second transparent protective film (protective layer) 16 are delivered in a direction of an arrow, and are attached together by using an adhesive or the like (not shown) while the respective longitudinal directions being arranged in the same direction. Thus, a laminate 126 of the second transparent protective film (protective layer) 16, the polarizer 11, and the transparent protective film (protective layer) 12 is obtained.

Figure 8B:
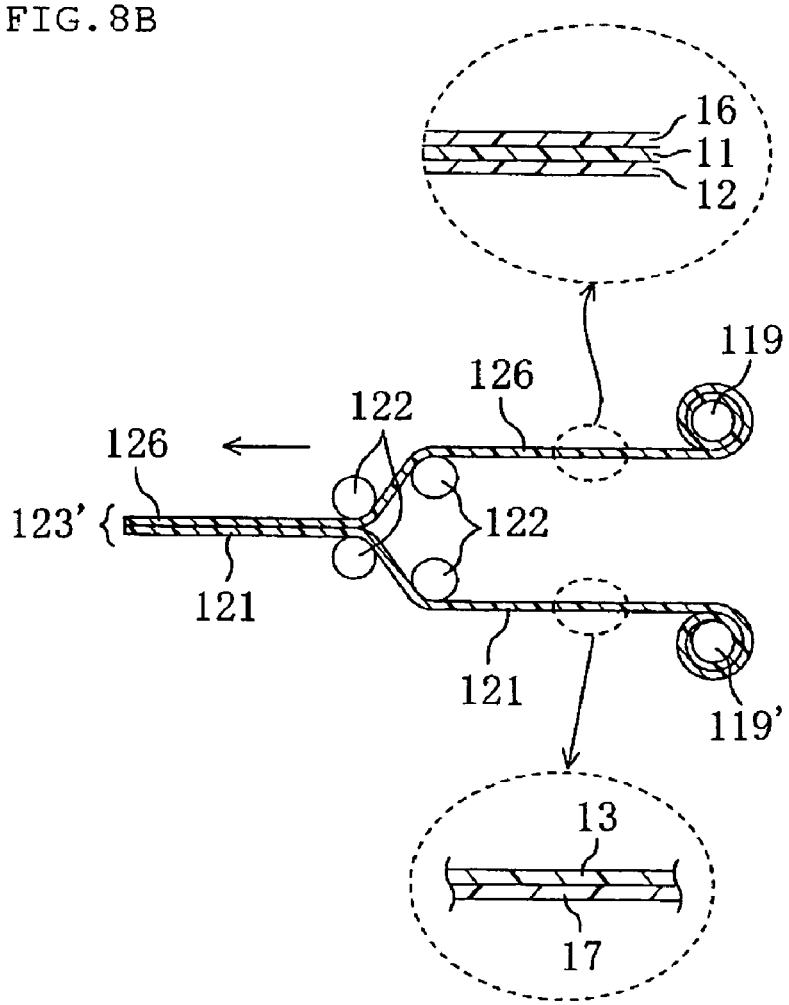

Next, as shown in a schematic diagram of FIG. 8B, the laminate 126 (of the second transparent protective film (protective layer) 16, the polarizer 11, and the transparent protective film (protective layer) 12) and the laminate 121 (of the first birefringent layer 13 and the substrate 17) are delivered in a direction of an arrow, and are attached together by using an adhesive or the like (not shown) while the respective longitudinal directions being arranged in the same direction. Thus, a laminate 123' of the second transparent protective film (protective layer) 16, the polarizer 11, the transparent protective film (protective layer) 12, the first birefringent layer 13, and the substrate 17 is obtained.

Next, as shown in FIG. 5B, the substrate 17 is peeled off from the laminate 123', so as to obtain the laminate 123 (of the second transparent protective film (protective layer) 16, the polarizer 11, the transparent protective film (protective layer) 12, and the first birefringent layer 13).

Furthermore, as shown in a schematic diagram of FIG. 6, the long second birefringent layer 14 is prepared, and the long second birefringent layer 14 and the laminate 123 are delivered in a direction of an arrow, and are attached together by using an adhesive or the like (not shown) while the respective longitudinal directions are arranged in the same direction.

Next, as shown in a schematic diagram of FIG. 7A, a laminate 125 (formed through application of the third birefringent layer 15 on a substrate 26) is prepared. The laminate 125 and the laminate 124 (of the second transparent protective film (protective layer) 16, the polarizer 11, the transparent protective film (protective layer) 12, the first birefringent layer 13, and the second birefringent layer 14) are delivered in a direction of an arrow, and are attached together by using an adhesive or the like (not shown) while the respective longitudinal directions are arranged in the same direction. Finally, as shown in FIG. 7B, the substrate 26 is peeled off from the attached laminates.

As described above, the elliptically polarizing plate 10 of the present invention is obtained.

B-7. Other Components of Elliptically Polarizing Plate

The elliptically polarizing plate of the present invention may further include another optical layer. Any suitable optical layers may be employed as the other optical layer in accordance with the purpose or the type of image display. Specific examples of the other optical layer include a birefringent layer (retardation film), a liquid crystal film, a light scattering film, and a diffraction film.

As described above, the elliptically polarizing plate of the present invention may include second transparent protective film (protective layer) 16 on a surface of the polarizer 11 without the transparent protective film (protective layer) 12 formed thereon. Any appropriate transparent protective film (protective layer) may be employed as the second transparent protective film (protective layer). For example, the film as described in the section A-6 may be used as the second protective layer. The second transparent protective film (protective layer) 16 and the transparent protective film (protective layer) 12 may be identical to or different from each other. The second transparent protective film (protective layer) 16 may be subjected to hard coat treatment, antireflection treatment, anti-sticking treatment, anti-glare treatment, or the like as required.

The elliptically polarizing plate of the present invention may further include a sticking layer as an outermost layer on at least one side. Inclusion of the sticking layer as an outermost layer facilitates lamination of the elliptically polarizing plate with other members (such as liquid crystal cell), to thereby prevent peeling off of the elliptically polarizing plate from other members. Any suitable materials may be employed as a material for the sticking layer. Specific examples of the material include those described in the section B-2. A material having excellent humidity resistance and thermal resistance is preferably used in view of preventing foaming or peeling due to moisture absorption, degradation of optical characteristics and warping of a liquid crystal cell due to difference in thermal expansion, and the like.

For practical purposes, the surface of the sticking layer is covered with an appropriate separator until the elliptically polarizing plate is actually used, to thereby prevent contamination. The separator may be formed by providing a release coating on any suitable film by using a silicone-based, long-chain alkyl-based, fluorine-based, or molybdenum sulfide release agent, for example.

Each layer of the elliptically polarizing plate of the present invention may be provided with UV absorbability through treatment or the like with a UV absorber such as a salicylate-based compound, a benzophenone-based compound, a benzotriazole-based compound, a cyanoacrylate-based compound, or a nickel complex salt-based compound.

C. Use of Elliptically Polarizing Plate

The elliptically polarizing plate of the present invention may be suitably used for various image displays (such as liquid crystal display and selfluminous display). Specific examples of the image display for which the elliptically polarizing plate may be used include a liquid crystal display, an EL display, a plasma display (PD), and a field emission display (FED). The elliptically polarizing plate of the present invention used for a liquid crystal display is useful for viewing angle compensation, for example. The elliptically polarizing plate of the present invention is used for a liquid crystal display of a circularly polarization mode, and is particularly useful for a homogeneous alignment TN liquid crystal display, an in-plane switching (IPS) liquid crystal display, and a vertical alignment (VA) liquid crystal display. The elliptically polarizing plate of the present invention used for an EL display is useful for prevention of electrode reflection, for example.

D. Image Display

Figure 9:
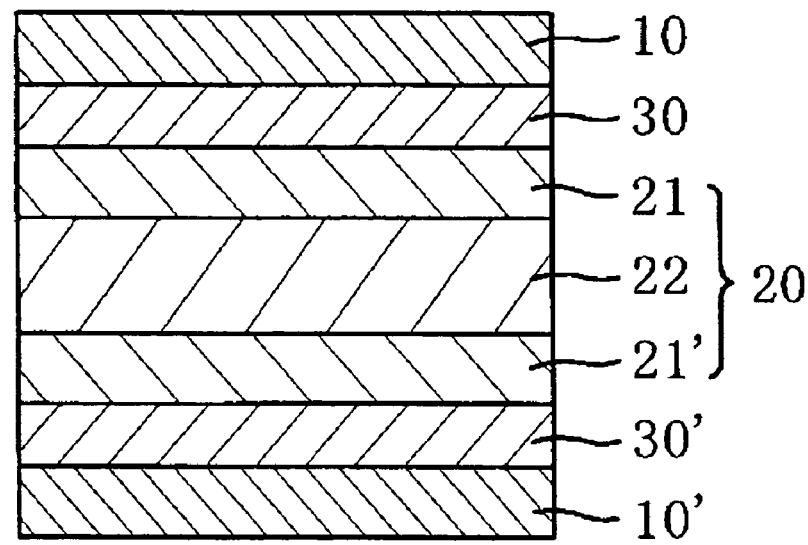
FIG. 9 is a schematic sectional view of a liquid crystal panel used for a liquid crystal display according to a preferred embodiment of the present invention.

A liquid crystal display will be described as an example of an image display of the present invention. Here, a liquid crystal panel used for the liquid crystal display will be described. Any suitable constitutions may be employed for a constitution of the liquid crystal display excluding the liquid crystal panel in accordance with the purpose. FIG. 9 is a schematic sectional view of a liquid crystal panel according to a preferred embodiment of the present invention. A liquid crystal panel 100 includes: a liquid crystal cell 20, retardation plates 30 and 30' arranged on both sides of the liquid crystal cell 20; and polarizing plates 10 and 10' arranged on outer sides of the respective retardation plates. Any suitable retardation plates may be employed as the retardation plates 30 and 30' in accordance with the purpose and an alignment mode of the liquid crystal cell. At least one of the retardation plates 30 and 30' may be omitted in accordance with the purpose and the alignment mode of the liquid crystal cell. The polarizing plate 10 employs the elliptically polarizing plate of the present invention as described above. The polarizing plate (elliptically polarizing plate) 10 is arranged such that the birefringent layers 13, 14 and 15 are positioned between the polarizer 11 and the liquid crystal cell 20. The polarizing plate 10' employs any suitable polarizing plates. The polarizing plates 10 and 10' are generally arranged such that absorption axes of the respective polarizers are perpendicular to each other. As shown in FIG. 9, the elliptically polarizing plate 10 of the present invention is preferably arranged on a viewer side (upper side) in the liquid crystal display (liquid crystal panel) of the present invention. The liquid crystal cell 20 includes: a pair of substrates (typically, glass substrates) 21 and 21'; and a liquid crystal layer 22 as a display medium arranged between the substrates. One substrate (active matrix substrate) 21' is provided with: a switching element (TFT, in general) for controlling electrooptic characteristics of liquid crystal; and a scanning line for providing a gate signal to the switching element and a signal line for providing a source signal thereto (the element and the lines not shown). The other substrate (color filter substrate) 21 is provided with color filters (not shown). The color filters may be provided in the active matrix substrate 21' as well. A space (cell gap) between the substrates 21 and 21' is controlled by a spacer (not shown). An alignment layer (not shown) formed of, for example, polyimide is provided on a side of each of the substrates 21 and 21' in contact with the liquid crystal layer 22.

Hereinafter, the present invention will be more specifically described by way of examples. However, the present invention is not limited to the examples. Methods of measuring characteristics in the examples are as described below.

(1) Measurement of Retardation

Refractive indices nx, ny, and nz of a sample film were measured with an automatic birefringence analyzer (Automatic birefringence analyzer KOBRA-31PR manufactured by Oji Scientific Instruments), and an in-plane retardation $\Delta$nd and a thickness direction retardation Rth were calculated. A measurement temperature was 23° C., and a measurement wavelength was 590 nm.

(2) Measurement of Thickness

The thickness of the first birefringent layer was measured through interference thickness measurement by using MCPD-2000, manufactured by Otsuka Electronics Co., Ltd. The thickness of each of other various films was measured with a dial gauge.

(3) Measurement of Transmittance

The same elliptically polarizing plates were attached together for elliptically polarizing plates obtained in Example 1. The elliptically polarizing plates of A series were attached such that the respective third birefringent layers opposed each other. The elliptically polarizing plates of B series were attached such that the respective second birefringent layers opposed each other. For attaching of the elliptically polarizing plates together, the elliptically polarizing plates were arranged such that slow axes of the respective second birefringent layers were at 90° (such that absorption axes of the respective polarizers were at 90°). A transmittance of each of the attached samples was measured by using "DOT-3" (trade name, manufactured by Murakami Color Research Laboratory). Laminated structures of the elliptically polarizing plates are described below.

Elliptically polarizing plates A01 to A18: polarizer/protective layer/first birefringent layer/second birefringent layer/third birefringent layer Elliptically polarizing plates B01 to B18: polarizer/protective layer/third birefringent layer/first birefringent layer/second birefringent layer (4) Measurement of Contrast Ratio The same elliptically polarizing plates were superimposed, and were irradiated with backlight. A white image (absorption axes of polarizers are parallel with each other) and a black image (absorption axes of polarizers are perpendicular to each other) were displayed, and were scanned in a direction of 45°-135° with respect to the absorption axis of the polarizer on the viewer side, and from −60° to 60° with respect to the normal by using "EZ Contrast 160D" (trade name, manufactured by ELDIM SA). A contrast ratio "YW/YB" in an oblique direction was calculated from a Y value (YW) of the white image and a Y value (YB) of the black image.

EXAMPLE 1

I. Preparation of Elliptically Polarizing Plate as Shown in FIG. 1A

I-a. Alignment Treatment for Substrate (Preparation of Alignment Substrate)

Substrates were subjected to alignment treatment, to thereby prepare alignment substrates.

Substrates (1) to (6): The surface of a polyethylene terephthalate (PET) film (thickness of 50 μm) was subjected to rubbing at a rubbing angle shown in Table 1 by using a rubbing cloth, to thereby form each of alignment substrates.

TABLE 1

| Substrate | Rubbing angle (angle α) |
|---|---|
| (1) | 13° |
| (2) | −13° |
| (3) | 23° |
| (4) | −23° |
| (5) | 33° |
| (6) | −33° |

I-b. Preparation of First Birefringent Layer 10 g of polymerizable liquid crystal (Paliocolor LC242, trade name; available from BASF Aktiengesellschaft) exhibiting a nematic liquid crystal phase, and 3 g of a photopolymerization initiator (IRGACURE 907, trade name; available from Ciba Specialty Chemicals) for the polymerizable liquid crystal compound were dissolved in 40 g of toluene, to thereby prepare a liquid crystal composition (application liquid). The liquid crystal composition was applied onto the alignment substrates (1) to (6) prepared as described above by using a bar coater, and the whole was heated and dried at 90° C. for 2 minutes, to thereby align the liquid crystal. The thus-formed liquid crystal layer was irradiated with light of 1 mJ/cm² by using a metal halide lamp, and the liquid crystal layer was cured, to thereby form each of first birefringent layers on each of the substrate.

The thickness and retardation of each of the first birefringent layers were adjusted by changing an application amount of the application liquid. Table 2 shows the thickness (μm) and in-plane retardation (nm) of each of the first birefringent layers formed.

TABLE 2

| Substrate + First birefringent layer | Substrate | Rubbing angle (angle α) | Thickness (μm) of first birefringent layer | In-plane retardation (nm) of first birefringent layer |
|---|---|---|---|---|
| (1a) | (1) | 13° | 2.4 | 240 |
| (2a) | (2) | −13° | 2.4 | 240 |
| (3a) | (3) | 23° | 2.2 | 180 |
| (3b) | (3) | 23° | 2.4 | 240 |
| (3c) | (3) | 23° | 2.6 | 300 |
| (4a) | (4) | −23° | 2.2 | 180 |
| (4b) | (4) | −23° | 2.4 | 240 |
| (4c) | (4) | −23° | 2.6 | 300 |
| (5a) | (5) | 33° | 2.4 | 240 |
| (5b) | (6) | −33° | 2.4 | 240 |

I-c. Preparation of Second Birefringent Layer

A polycarbonate film (thickness of 60 μm) or a norbornene-based film (Arton, trade name; available from JSR Corporation; thickness of 60 μm) was uniaxially stretched at a predetermined temperature, to thereby prepare each of films for second birefringent layers. Table 3 shows the type of film used (polycarbonate film is represented by PC, and norbornene film is represented by NB), the stretching conditions (such as a stretching direction), the alignment angle, and the retardation value to be obtained. Note that, the alignment angle means an angle of a slow axis of the film with respect to a longitudinal direction.

TABLE 3

| | Stretching conditions | | | Birefringent layer | | |
|---|---|---|---|---|---|---|
| Film No. | Direction | Temperature | Ratio | Angle β | Thickness | Retardation |
| (a1) PC | Transverse | 150° C. | 1.2 times | 90° | 50 μm | 60 nm |
| (a2) PC | Transverse | 150° C. | 1.3 times | 90° | 50 μm | 90 nm |
| (a3) PC | Transverse | 150° C. | 1.45 times | 90° | 50 μm | 120 nm |
| (a4) PC | Transverse | 150° C. | 1.6 times | 90° | 50 μm | 150 nm |
| (a5) PC | Transverse | 150° C. | 2.0 times | 90° | 50 μm | 180 nm |
| (a6) PC | Longitudinal | 140° C. | 1.05 times | 0° | 55 μm | 140 nm |
| (a7) NB | Longitudinal | 170° C. | 1.4 times | 0° | 65 μm | 140 nm |
| (b1) PC | Longitudinal | 140° C. | 1.1 times | 0° | 55 μm | 270 nm |
| (b2) NB | Longitudinal | 170° C. | 1.9 times | 0° | 65 μm | 270 nm |

I-d. Production of Third Birefringent Layer 20 parts by weight of a side chain-type liquid crystal polymer represented by the following chemical formula (where: the numbers 65 and 35 each represent mol % of a monomer unit; the polymer is represented as a block polymer for convenience; and the polymer has a weight average molecular weight of 5,000), 80 parts by weight of polymerizable nematic liquid crystals exhibiting a liquid crystal phase "Paliocolor LC242" (trade name, available from BASF Aktiengesellschaft), and 5 parts by weight of a photopolymerization initiator "IRGACURE 907" (trade name, available from Ciba Specialty Chemicals) were dissolved in 200 parts by weight of cyclopentanone, to thereby prepare a liquid crystal application liquid. Then, the application liquid was applied on a substrate film "ZEONOR" (trade name, norbornene-based resin film, available from Zeon Corporation) by using a bar coater, and the whole was dried under heating at 100° C. for 10 minutes, to thereby align the liquid crystals. The liquid crystal layer was irradiated with UV light, and the liquid crystal layer was cured, to thereby form each of films for third birefringent layers C1 to C4 on the substrate. The films for third birefringent layers each had an in-plane retardation of substantially 0. Table 4 shows thickness direction retardation of the films for third birefringent layers.

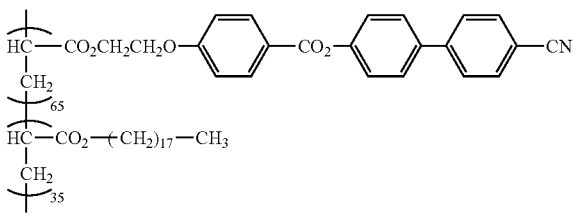

TABLE 4

| No. | Thickness | In-plane retardation | Thickness direction retardation |
|---|---|---|---|
| (C1) | 0.7 μm | 0 nm | −68 nm |
| (C2) | 1.1 μm | 0 nm | −110 nm |
| (C3) | 1.5 μm | 0 nm | −153 nm |
| (C4) | 1.8 μm | 0 nm | −183 nm |

I-e. Preparation of Elliptically Polarizing Plate

A polyvinyl alcohol film was colored in an aqueous solution containing iodine and was then uniaxially stretched to 6 times length between rolls of different speed ratios in an aqueous solution containing boric acid, to thereby obtain a polarizer.

As shown in a schematic diagram of FIG. 5A, the polarizer, protective layer (TAC film, thickness of 40 μm, thickness direction retardation of 60 nm), and a laminate of the first birefringent layer and the substrate were delivered in a direction of an arrow, and were attached together by using a moistsetting adhesive including isocyanate "M-631N" (trade name, available from Mitsui Takeda Chemicals, Inc.) while the respective longitudinal directions being arranged in the same direction. The thickness of the adhesive was 5 μm.

Next, as shown in FIG. 5B, the substrate was peeled off from the laminate (of the polarizer, the protective layer, the first birefringent layer, and the substrate), so as to obtain the laminate (of the polarizer, the protective layer, and the first birefringent layer).

Furthermore, as shown in a schematic diagram of FIG. 6, the long second birefringent layers (a1) to (a7) and (b1) to (b2) were prepared, and each of the long second birefringent layers and the laminate obtained above were delivered in a direction of an arrow, and were attached together by using a moistsetting adhesive including isocyanate "M-631N" (trade name, available from Mitsui Takeda Chemicals, Inc.) while the respective longitudinal directions were arranged in the same direction.

As shown in a schematic diagram of FIG. 7A, the third birefringent layers (C1) to (C4) were respectively prepared on a long substrate, and the third birefringent layer on the substrate and the laminate (of the polarizer, the protective layer, the first birefringent layer, and the second birefringent layer) obtained above were delivered in a direction of an arrow, and were attached together by using a moistsetting adhesive including isocyanate "M-631N" (trade name, available from Mitsui Takeda Chemicals, Inc.) while the respective longitudinal directions were arranged in the same direction. Finally, as shown in FIG. 7B, the substrate was peeled off from the attached laminates.

As described above, the elliptically polarizing plate A01 to A18 were obtained as shown in Table 5.

TABLE 5

| Elliptical Polarizing plate | Protective layer Thickness direction retardation (nm) | First birefringent layer Angle α | First birefringent layer In-plane retardation (nm) | Second birefringent layer Thickness direction retardation | Third birefringent layer Thickness direction retardation | Transmittance (%) | Total thickness (μm) |
|---|---|---|---|---|---|---|---|
| A01 | 61 | +23° | 180 | a3(120 nm) | C1(−68 nm) | 0.10 | 176 |
| A02 | 59 | −23° | 180 | a3(120 nm) | C1(−68 nm) | 0.10 | 176 |
| A03 | 61 | +23° | 240 | a3(120 nm) | C2(−110 nm) | 0.05 | 176 |
| A04 | 59 | −23° | 240 | a3(120 nm) | C2(−110 nm) | 0.05 | 176 |
| A05 | 61 | +23° | 300 | a3(120 nm) | C3(−153 nm) | 0.08 | 177 |
| A06 | 59 | −23° | 300 | a3(120 nm) | C3(−153 nm) | 0.08 | 177 |
| A07 | 61 | +23° | 240 | a2(90 nm) | C4(−183 nm) | 0.09 | 176 |
| A08 | 59 | −23° | 240 | a2(90 nm) | C4(−183 nm) | 0.09 | 176 |
| A09 | 61 | +23° | 240 | a4(150 nm) | C1(−68 nm) | 0.10 | 176 |
| A10 | 59 | −23° | 240 | a4(150 nm) | C1(−68 nm) | 0.10 | 176 |
| A11 | 61 | +13° | 240 | a3(120 nm) | C1(−68 nm) | 0.13 | 176 |
| A12 | 61 | −13° | 240 | a3(120 nm) | C1(−68 nm) | 0.13 | 176 |
| A13 | 61 | +33° | 240 | a3(120 nm) | C1(−68 nm) | 0.14 | 176 |
| A14 | 61 | −33° | 240 | a3(120 nm) | C1(−68 nm) | 0.14 | 176 |
| A15 | 61 | −23° | 240 | a3(120 nm) | C1(−68 nm) | 0.06 | 176 |
| A16 | 61 | −33° | 240 | a3(120 nm) | C1(−68 nm) | 0.06 | 176 |
| A17 | 61 | +23° | 240 | a3(120 nm) | C1(−68 nm) | 0.07 | 176 |
| A18 | 61 | −23° | 240 | a3(120 nm) | C1(−68 nm) | 0.07 | 176 |

EXAMPLE 2

II. Production of Elliptically Polarizing Plate as Shown in FIG. 1B

The same polarizer, protective layer, laminate of the first birefringent layer and the substrate, second birefringent layers (a1) to (a7) and (b1) to (b2), the third birefringent layers (C1) to (C4) respectively formed on the substrate, and adhesive as those of Example 1 were used. The polarizer, the protective layer, the third birefringent layer, the first birefringent layer, and the second birefringent layer were used in the combination shown in Table 6, and were laminated by roll to roll, to thereby obtain each of elliptically polarizing plates B01 to B18. In the lamination step, the third birefringent layer was transferred from the substrate film to the surface of the protective layer, and the first birefringent layer was transferred from the substrate film to the surface of the third birefringent layer. The second birefringent layer was formed on the surface of the first birefringent layer.

angle of 50° for contrast 10 in all directions, and a difference between the maximum and minimum angles of 10°. The minimum angle of 40° for contrast 10 in all directions was at a preferred level in practical use. Further, the difference between the maximum and minimum angles of 10° was small and was also at a very preferred level in practical use, and thus the elliptically polarizing plate had balanced visual characteristics.

EXAMPLE 5

The elliptically polarizing plates A03 were superimposed to measure a contrast ratio. Table 5 reveals that the elliptically polarizing plate had $Rth_3/Rthp$ of 1.8. The elliptically polarizing plate had the minimum angle of 40° and maximum angle of 60° for contrast 10 in all directions, and a difference between the maximum and minimum angles of 20°. The minimum angle of 40° for contrast 10 in all directions was at a preferred level in practical use.

TABLE 6

| Elliptical Polarizing plate | Protective layer Thickness direction retardation (nm) | First birefringent layer Angle α | First birefringent layer In-plane retardation (nm) | Second birefringent layer Thickness direction retardation | Third birefringent layer Thickness direction retardation | Transmittance (%) | Total thickness (μm) |
|---|---|---|---|---|---|---|---|
| B01 | 61 | +23° | 180 | a3(120 nm) | C1(−68 nm) | 0.10 | 176 |
| B02 | 59 | −23° | 180 | a3(120 nm) | C1(−68 nm) | 0.10 | 176 |
| B03 | 61 | +23° | 240 | a3(120 nm) | C2(−110 nm) | 0.05 | 176 |
| B04 | 59 | −23° | 240 | a3(120 nm) | C2(−110 nm) | 0.05 | 176 |
| B05 | 61 | +23° | 300 | a3(120 nm) | C3(−153 nm) | 0.08 | 177 |
| B06 | 59 | −23° | 300 | a3(120 nm) | C3(−153 nm) | 0.08 | 177 |
| B07 | 61 | +23° | 240 | a2(90 nm) | C4(−183 nm) | 0.09 | 176 |
| B08 | 59 | −23° | 240 | a2(90 nm) | C4(−183 nm) | 0.09 | 176 |
| B09 | 61 | +23° | 240 | a4(150 nm) | C1(−68 nm) | 0.10 | 176 |
| B10 | 59 | −23° | 240 | a4(150 nm) | C1(−68 nm) | 0.10 | 176 |
| B11 | 61 | +13° | 240 | a3(120 nm) | C1(−68 nm) | 0.13 | 176 |
| B12 | 61 | −13° | 240 | a3(120 nm) | C1(−68 nm) | 0.13 | 176 |
| B13 | 61 | +33° | 240 | a3(120 nm) | C1(−68 nm) | 0.14 | 176 |
| B14 | 61 | −33° | 240 | a3(120 nm) | C1(−68 nm) | 0.14 | 176 |
| B15 | 61 | −23° | 240 | a3(120 nm) | C1(−68 nm) | 0.06 | 176 |
| B16 | 61 | −33° | 240 | a3(120 nm) | C1(−68 nm) | 0.06 | 176 |
| B17 | 61 | +23° | 240 | a3(120 nm) | C1(−68 nm) | 0.07 | 176 |
| B18 | 61 | −23° | 240 | a3(120 nm) | C1(−68 nm) | 0.07 | 176 |

EXAMPLE 3

The elliptically polarizing plates A01 were superimposed to measure a contrast ratio. Table 5 reveals that the elliptically polarizing plate had $Rth_3/Rthp$ of 1.1. The elliptically polarizing plate had the minimum angle of 40° and maximum angle of 50° for contrast 10 in all directions, and a difference between the maximum and minimum angles of 10°. The minimum angle of 40° for contrast 10 in all directions was at a preferred level in practical use. Further, the difference between the maximum and minimum angles of 10° was small and was also at a very preferred level in practical use, and thus the elliptically polarizing plate had balanced visual characteristics.

EXAMPLE 4

The elliptically polarizing plates A02 were superimposed to measure a contrast ratio. Table 5 reveals that the elliptically polarizing plate had $Rth_3/Rthp$ of 1.1. The elliptically polarizing plate had the minimum angle of 40° and maximum

EXAMPLE 6

The elliptically polarizing plates A04 were superimposed to measure a contrast ratio. Table 5 reveals that the elliptically polarizing plate had $Rth_3/Rthp$ of 1.8. The elliptically polarizing plate had the minimum angle of 40° and maximum angle of 60° for contrast 10 in all directions, and a difference between the maximum and minimum angles of 20°. The minimum angle of 40° for contrast 10 in all directions was at a preferred level in practical use.

EXAMPLE 7

The elliptically polarizing plates A05 were superimposed to measure a contrast ratio. Table 5 reveals that the elliptically polarizing plate had $Rth_3/Rthp$ of 2.5. The elliptically polarizing plate had the minimum angle of 40° and maximum angle of 70° for contrast 10 in all directions, and a difference between the maximum and minimum angles of 30°. The minimum angle of 40° for contrast 10 in all directions was at a preferred level in practical use.

EXAMPLE 8

The elliptically polarizing plates A06 were superimposed to measure a contrast ratio. Table 5 reveals that the elliptically polarizing plate had $Rth_3/Rthp$ of 2.5. The elliptically polarizing plate had the minimum angle of 40° and maximum angle of 70° for contrast 10 in all directions, and a difference between the maximum and minimum angles of 30°. The minimum angle of 40° for contrast 10 in all directions was at a preferred level in practical use.

EXAMPLE 9

The elliptically polarizing plates A07 were superimposed to measure a contrast ratio. Table 5 reveals that the elliptically polarizing plate had $Rth_3/Rthp$ of 3. The elliptically polarizing plate had the minimum angle of 40° and maximum angle of 90° for contrast 10 in all directions, and a difference between the maximum and minimum angles of 50°. The minimum angle of 40° for contrast 10 in all directions was at a preferred level in practical use.

EXAMPLE 10

The elliptically polarizing plates A08 were superimposed to measure a contrast ratio. Table 5 reveals that the elliptically polarizing plate had $Rth_3/Rthp$ of 3. The elliptically polarizing plate had the minimum angle of 40° and maximum angle of 90° for contrast 10 in all directions, and a difference between the maximum and minimum angles of 50°. The minimum angle of 40° for contrast 10 in all directions was at a preferred level in practical use.

COMPARATIVE EXAMPLE 1

The elliptically polarizing plates each having the same structure as the elliptically polarizing plate A01 except that the third birefringent layer was not formed were superimposed to measure a contrast ratio. The elliptically polarizing plate had the minimum angle of 30° and maximum angle of 50° for contrast 10 in all directions, and a difference between the maximum and minimum angles of 20°. The minimum angle of 30° for contrast 10 in all directions was not at an appropriate level in practical use.

COMPARATIVE EXAMPLE 2

The elliptically polarizing plates each having the same structure as the elliptically polarizing plate A02 except that the third birefringent layer was not formed were superimposed to measure a contrast ratio. The elliptically polarizing plate had the minimum angle of 30° and maximum angle of 50° for contrast 10 in all directions, and a difference between the maximum and minimum angles of 20°. The minimum angle of 30° for contrast 10 in all directions was not at an appropriate level in practical use.

EXAMPLE 11

The elliptically polarizing plates B01 were superimposed to measure a contrast ratio. Table 6 reveals that the elliptically polarizing plate had $Rth_3/Rthp$ of 1.1. The elliptically polarizing plate had the minimum angle of 40° and maximum angle of 50° for contrast 10 in all directions, and a difference between the maximum and minimum angles of 10°. The minimum angle of 40° for contrast 10 in all directions was at a preferred level in practical use. Further, the difference between the maximum and minimum angles of 10° was small and was also at a very preferred level in practical use, and thus the elliptically polarizing plate had balanced visual characteristics.

EXAMPLE 12

The elliptically polarizing plates B02 were superimposed to measure a contrast ratio. Table 6 reveals that the elliptically polarizing plate had $Rth_3/Rthp$ of 1.1. The elliptically polarizing plate had the minimum angle of 40° and maximum angle of 50° for contrast 10 in all directions, and a difference between the maximum and minimum angles of 10°. The minimum angle of 40° for contrast 10 in all directions was at a preferred level in practical use. Further, the difference between the maximum and minimum angles of 10° was small and was also at a very preferred level in practical use, and thus the elliptically polarizing plate had balanced visual characteristics.

EXAMPLE 13

The elliptically polarizing plates B03 were superimposed to measure a contrast ratio. Table 6 reveals that the elliptically polarizing plate had $Rth_3/Rthp$ of 1.8. The elliptically polarizing plate had the minimum angle of 40° and maximum angle of 60° for contrast 10 in all directions, and a difference between the maximum and minimum angles of 20°. The minimum angle of 40° for contrast 10 in all directions was at a preferred level in practical use.

EXAMPLE 14

The elliptically polarizing plates B04 were superimposed to measure a contrast ratio. Table 6 reveals that the elliptically polarizing plate had $Rth_3/Rthp$ of 1.8. The elliptically polarizing plate had the minimum angle of 40° and maximum angle of 60° for contrast 10 in all directions, and a difference between the maximum and minimum angles of 20°. The minimum angle of 40° for contrast 10 in all directions was at a preferred level in practical use.

EXAMPLE 15

The elliptically polarizing plates B05 were superimposed to measure a contrast ratio. Table 6 reveals that the elliptically polarizing plate had $Rth_3/Rthp$ of 2.5. The elliptically polarizing plate had the minimum angle of 40° and maximum angle of 70° for contrast 10 in all directions, and a difference between the maximum and minimum angles of 30°. The minimum angle of 40° for contrast 10 in all directions was at a preferred level in practical use.

EXAMPLE 16

The elliptically polarizing plates B06 were superimposed to measure a contrast ratio. Table 6 reveals that the elliptically polarizing plate had $Rth_3/Rthp$ of 2.5. The elliptically polarizing plate had the minimum angle of 40° and maximum angle of 70° for contrast 10 in all directions, and a difference between the maximum and minimum angles of 30°. The minimum angle of 40° for contrast 10 in all directions was at a preferred level in practical use.

EXAMPLE 17

The elliptically polarizing plates B07 were superimposed to measure a contrast ratio. Table 6 reveals that the elliptically polarizing plate had $Rth_3/Rthp$ of 3. The elliptically polarizing plate had the minimum angle of 40° and maximum angle of 90° for contrast 10 in all directions, and a difference between the maximum and minimum angles of 50°. The minimum angle of 40° for contrast 10 in all directions was at a preferred level in practical use.

EXAMPLE 18

The elliptically polarizing plates B08 were superimposed to measure a contrast ratio. Table 6 reveals that the elliptically polarizing plate had $Rth_3/Rthp$ of 3. The elliptically polarizing plate had the minimum angle of 40° and maximum angle of 90° for contrast 10 in all directions, and a difference between the maximum and minimum angles of 50°. The minimum angle of 40° for contrast 10 in all directions was at a preferred level in practical use.

COMPARATIVE EXAMPLE 3

The elliptically polarizing plates each having the same structure as the elliptically polarizing plate B01 except that the third birefringent layer was not formed were superimposed to measure a contrast ratio. The elliptically polarizing plate had the minimum angle of 30° and maximum angle of 50° for contrast 10 in all directions, and a difference between the maximum and minimum angles of 20°. The minimum angle of 30° for contrast 10 in all directions was not at an appropriate level in practical use.

COMPARATIVE EXAMPLE 4

The elliptically polarizing plates each having the same structure as the elliptically polarizing plate B02 except that the third birefringent layer was not formed were superimposed to measure a contrast ratio. The elliptically polarizing plate had the minimum angle of 30° and maximum angle of 50°for contrast 10 in all directions, and a difference between the maximum and minimum angles of 20°. The minimum angle of 30° for contrast 10 in all directions was not at an appropriate level in practical use.

[Evaluation]

The results of Examples and Comparative Examples reveal that the elliptically polarizing plates of Examples of the present invention each had a third birefringent layer formed, thereby to realize the minimum angle of 40° for contrast 10 in all directions, which ensures a preferred level in practical use. In particular, the difference between the maximum and minimum angles for contrast 10 was reduced to 10° in each of Examples 3, 4, 11 and 12, which provides well-balanced visual properties and was also at a very preferred level in practical use. In contrast, the results of Comparative Examples reveal that the elliptically polarizing plates of Comparative Examples each had the minimum angle of 30° for contrast 10 in all directions, which was not at an appropriate level in practical use.

The results of Examples and Comparative Examples reveal that, according to the present invention, the slow axis of the first birefringent layer which can function as a $\lambda/2$ plate can be set in any desired directions, and thus along polarizing film (polarizer) stretched in a longitudinal direction (that is, a film having an absorption axis in a longitudinal direction) can be used. In other words, a long first birefringent layer formed on a long substrate which has been subjected to the alignment treatment at a predetermined angle with respect to its longitudinal direction, a long transparent protective film and a long polarizing film (polarizer); or a long first birefringent layer formed on a long substrate which has been subjected to the alignment treatment at a predetermined angle with respect to its longitudinal direction and a laminate having a long polarizing film (polarizer) and a long transparent protective film; may be continuously attached together while the respective longitudinal directions being arranged in the same direction (by so-called roll to roll). Thus, an elliptically polarizing plate was obtained at very high production efficiency. According to the method of the present invention, the transparent protective film or the polarizer need not be cut out obliquely with respect to its longitudinal direction (stretching direction) for lamination. As a result, angles of optical axes do not vary with respect to every cut-out film, resulting in an elliptically polarizing film without variation in quality with respect to every product. Further, no wastes are produced by cutting of the film, and the elliptically polarizing plate was obtained at low cost and production of a large polarizing plate was facilitated. Furthermore, according to an embodiment of the present invention, the second birefringent layer is easily formed by laminating the polymer film on a surface of the first birefringent layer. Long sides of the polymer film and the first birefringent layer may be continuously attached together, so as to obtain the second birefringent layer on the first birefringent layer. Thus, an elliptically polarizing plate can be obtained at very high production efficiency. Since the elliptically polarizing plate may be obtained by using so-called roll to roll attachment, adhesiveness between adjacent layers (films) can be very excellent. Furthermore, according to the present invention, the third birefringent layer having a refractive index profile of nz>nx=ny is used in combination with the $\lambda/4$ plate and the $\lambda/2$ plate. Therefore, a broadband and wide viewing angle elliptically polarizing plate with excellent properties even in an oblique direction, and an image display using the same was obtained.

The elliptically polarizing plate obtainable by the process of the present invention may suitably be used for various image displays (such as a liquid crystal display and a selfluminous display).

Many other modifications will be apparent to and be readily practiced by those skilled in the art without departing from the scope and spirit of the invention. It should therefore be understood that the scope of the appended claims is not intended to be limited by the details of the description but should rather be broadly construed.

What is claimed is:

1. A method of producing an elliptically polarizing plate, comprising the steps of:

forming a first birefringent layer on a surface of a transparent protective film (T);

laminating a polarizer on a surface of the transparent protective film (T);

laminating a polymer film on a surface of the first birefringent layer, so as to form a second birefringent layer; and forming a third birefringent layer having a refractive index profile of nz>nx=ny on a surface of the second birefringent layer, wherein the first birefringent layer is arranged on the opposite side against the polarizer with respect to the transparent protective film (T), and wherein the step of forming the first birefringent layer comprises the steps of: applying an application liquid containing a liquid crystal material onto a substrate subjected to an alignment treatment; treating the applied liquid crystal material at a temperature at which the liquid crystal material exhibits a liquid crystal phase, so as to form the first birefringent layer on the substrate; and transferring the first birefringent layer formed on the substrate onto a surface of the transparent protective film (T).

2. A method of producing an elliptically polarizing plate according to claim 1, wherein:
all of the polarizer, the transparent protective film (T), the first birefringent layer formed on the substrate, and the polymer film which forms the second birefringent layer comprise long films;
the polarizer, the transparent protective film (T), and the first birefringent layer formed on the substrate are continuously attached together while respective longitudinal directions being arranged in the same direction, so as to form a laminate having the polarizer, the transparent protective film (T), the first birefringent layer, and the substrate in the order;
the substrate is peeled off from the laminate; and
the laminate from which the substrate is peeled off and the polymer film which forms the second birefringent layer are continuously attached together while respective longitudinal directions being arranged in the same direction.

3. A method of producing an elliptically polarizing plate according to claim 1, wherein the liquid crystal material comprises at least one of a liquid crystal monomer and a liquid crystal polymer.

4. A method of producing an elliptically polarizing plate according to claim 1, wherein the first birefringent layer comprises a λ/2 plate.

5. A method of producing an elliptically polarizing plate according to claim 1, wherein the second birefringent layer comprises a λ/4 plate.

6. A method of producing an elliptically polarizing plate according to claim 1, wherein the substrate comprises a polyethylene terephthalate film.

7. A method of producing an elliptically polarizing plate according to claim 1, wherein the polymer film comprises a stretched film.

8. A method of producing an elliptically polarizing plate according to claim 1, wherein an absorption axis of the polarizer and a slow axis of the second birefringent layer are substantially perpendicular to each other.

9. A method of producing an elliptically polarizing plate according to claim 1, wherein a slow axis of the first birefringent layer defines one angle of +8° to +38° and −8° to −38° with respect to an absorption axis of the polarizer.

10. A method of producing an elliptically polarizing plate according to claim 1, wherein the transparent protective film (T) is formed of a film containing triacetyl cellulose as a main component.

11. A method of producing an elliptically polarizing plate, comprising the steps of:
forming a third birefringent layer having a refractive index profile of nz>nx=ny on a surface of a transparent protective film (T);
laminating a polarizer on a surface of the transparent protective film (T);
forming a first birefringent layer on a surface of the third birefringent layer; and
laminating a polymer film on a surface of the first birefringent layer, so as to form a second birefringent layer; and
wherein the third birefringent layer is arranged on the opposite side against the polarizer with respect to the transparent protective film (T), and
wherein the step of forming the first birefringent layer comprises the steps of:
applying an application liquid containing a liquid crystal material onto a substrate subjected to an alignment treatment; treating the applied liquid crystal material at a temperature at which the liquid crystal material exhibits a liquid crystal phase, so as to form the first birefringent layer on the substrate; and transferring the first birefringent layer formed on the substrate onto a surface of the third birefringent layer.

12. A method of producing an elliptically polarizing plate according to claim 11, wherein
all of the polarizer, the transparent protective film (T), the third birefringent layer, the first birefringent layer formed on the substrate, and the polymer film which forms the second birefringent layer comprise long films;
a laminate having the polarizer, the transparent protective film (T), and the third birefringent layer in the order, and the first birefringent layer formed on the substrate are continuously attached together while respective longitudinal directions being arranged in the same direction, so as to form a laminate having the polarizer, the transparent protective film (T), the third birefringent layer, the first birefringent layer, and the substrate in the order;
the substrate is peeled off from the laminate; and
the laminate from which the substrate is peeled off and the polymer film which forms the second birefringent layer are continuously attached together while respective longitudinal directions being arranged in the same direction.

13. A method of producing an elliptically polarizing plate according to claim 11, wherein the liquid crystal material comprises at least one of a liquid crystal monomer and a liquid crystal polymer.

14. A method of producing an elliptically polarizing plate according to claim 11, wherein the first birefringent layer comprises a λ/2 plate.

15. A method of producing an elliptically polarizing plate according to claim 11, wherein the second birefringent layer comprises a λ/4 plate.

16. A method of producing an elliptically polarizing plate according to claim 11, wherein the substrate comprises a polyethylene terephthalate film.

17. A method of producing an elliptically polarizing plate according to claim 11, wherein the polymer film comprises a stretched film.

18. A method of producing an elliptically polarizing plate according to claim 11, wherein an absorption axis of the polarizer and a slow axis of the second birefringent layer are substantially perpendicular to each other.

19. A method of producing an elliptically polarizing plate according to claim 11, wherein a slow axis of the first birefringent layer defines one angle of +8° to +38° and −8° to −38° with respect to an absorption axis of the polarizer.

20. A method of producing an elliptically polarizing plate according to claim 11, wherein the transparent protective film (T) is formed of a film containing triacetyl cellulose as a main component.

21. An elliptically polarizing plate produced through the production method according to claim 1.

22. An image display comprising an elliptically polarizing plate according to claim 21.

23. An image display according to claim 22, wherein the elliptically polarizing plate is arranged on a viewer side.

24. An elliptically polarizing plate produced through the production method according to claim 11.

25. An image display comprising an elliptically polarizing plate according to claim 24.

26. An image display according to claim 25, wherein the elliptically polarizing plate is arranged on a viewer side.

* * * * *